United States Patent
Sagisaka et al.

(10) Patent No.: US 8,878,977 B2
(45) Date of Patent: Nov. 4, 2014

(54) IMAGE PROCESSING APPARATUS HAVING A CANDIDATE FOCUS POSITION EXTRACTING PORTION AND CORRESPONDING FOCUS ADJUSTING METHOD

(71) Applicant: Keyence Corporation, Osaka (JP)

(72) Inventors: Hiroshi Sagisaka, Osaka (JP); Keisuke Nagoshi, Osaka (JP)

(73) Assignee: Keyence Corporation, Osaka (JP)

( * ) Notice: Subject to any disclaimer, the term of this patent is extended or adjusted under 35 U.S.C. 154(b) by 120 days.

(21) Appl. No.: 13/654,825

(22) Filed: Oct. 18, 2012

(65) Prior Publication Data

US 2013/0135490 A1    May 30, 2013

(30) Foreign Application Priority Data

Nov. 24, 2011    (JP) .................................. 2011-256012

(51) Int. Cl.
*G03B 13/00* (2006.01)
*H04N 5/232* (2006.01)

(52) U.S. Cl.
USPC .......................................... 348/345; 348/354

(58) Field of Classification Search
None
See application file for complete search history.

(56) References Cited

U.S. PATENT DOCUMENTS

| | | | | |
|---|---|---|---|---|
| 6,441,855 | B1 * | 8/2002 | Omata et al. .................. | 348/356 |
| 2006/0002698 | A1 * | 1/2006 | Terayama ...................... | 396/123 |
| 2007/0116448 | A1 * | 5/2007 | Liao et al. ...................... | 396/89 |
| 2007/0188652 | A1 * | 8/2007 | Yuyama ........................ | 348/372 |
| 2008/0239136 | A1 * | 10/2008 | Kanai et al. ................... | 348/340 |
| 2009/0180021 | A1 * | 7/2009 | Kikuchi et al. ............... | 348/349 |
| 2010/0254691 | A1 * | 10/2010 | Hori .............................. | 396/125 |
| 2012/0287308 | A1 * | 11/2012 | Kojima et al. ................ | 348/239 |

FOREIGN PATENT DOCUMENTS

| | | |
|---|---|---|
| JP | 2007-316432 | 6/2007 |
| JP | 2009-053485 | 12/2009 |

* cited by examiner

*Primary Examiner* — Justin P Misleh
(74) *Attorney, Agent, or Firm* — Kilyk & Bowersox, P.L.L.C.

(57) ABSTRACT

Provided is an image processing apparatus which is capable of easily selecting an optimum focus position for an inspection object even when a plurality of candidate focus positions are present. The image processing apparatus according to the invention includes: an imaging unit for imaging a region including an inspection object; a display unit for displaying an image; a focus adjusting unit for adjusting a focus position with respect to the inspection object; and an image processing unit for executing image processing on image data. A plurality of positions where part of the imaged region comes into a focused state are extracted as candidate focus positions, while the focus position with respect to the inspection object is changed, and candidate focus position information is displayed in the display unit. Selection of a focus position is accepted among the plurality of displayed candidate focus positions.

12 Claims, 22 Drawing Sheets

| LENS POSITION | | | | | | | | | |
|---|---|---|---|---|---|---|---|---|---|
| FAR | | | | | | | | | NEAR |
| | 0 | 5 | 10 | 15 | 20 | 25 | 30 | 35 | 40 |
| POINT 1 | 0 | 10 | 20 | 40 | 100 | 30 | 10 | 0 | 0 |
| 2 | 0 | 15 | 30 | 45 | 150 | 35 | 15 | 0 | 0 |
| 3 | 0 | 10 | 25 | 50 | 120 | 30 | 10 | 0 | 0 |
| 4 | 0 | 10 | 30 | 40 | 150 | 20 | 5 | 0 | 0 |
| 5 | 0 | 20 | 35 | 60 | 120 | 55 | 25 | 5 | 0 |
| 6 | 0 | 10 | 20 | 35 | 130 | 15 | 0 | 0 | 0 |
| 7 | 0 | 10 | 25 | 50 | 125 | 30 | 5 | 0 | 0 |
| 8 | 0 | 20 | 25 | 55 | 155 | 40 | 15 | 0 | 0 |
| 9 | 0 | 0 | 0 | 0 | 0 | 15 | 40 | 150 | 50 |
| 10 | 0 | 0 | 0 | 0 | 0 | 25 | 35 | 120 | 75 |
| 11 | 0 | 0 | 0 | 15 | 55 | 60 | 80 | 130 | 60 |
| 12 | 0 | 0 | 0 | 5 | 20 | 50 | 60 | 110 | 50 |

| LENS POSITION | | | | | | | | | |
|---|---|---|---|---|---|---|---|---|---|
| FAR | | | | | | | | | NEAR |
| | 0 | 5 | 10 | 15 | 20 | 25 | 30 | 35 | 40 |
| POINT 1 | 0 | 10 | 20 | 40 | 100 | 30 | 10 | 0 | 0 |
| 2 | 0 | 0 | 15 | 30 | 45 | 150 | 35 | 15 | 0 |
| 3 | 0 | 10 | 25 | 50 | 120 | 30 | 10 | 0 | 0 |
| 4 | 0 | 10 | 30 | 40 | 150 | 20 | 5 | 0 | 0 |
| 5 | 0 | 20 | 35 | 60 | 120 | 55 | 25 | 5 | 0 |
| 6 | 10 | 20 | 35 | 130 | 15 | 0 | 0 | 0 | 0 |
| 7 | 0 | 10 | 25 | 50 | 125 | 30 | 5 | 0 | 0 |
| 8 | 0 | 20 | 25 | 55 | 155 | 40 | 15 | 0 | 0 |
| 9 | 0 | 0 | 0 | 0 | 0 | 15 | 40 | 150 | 50 |
| 10 | 0 | 0 | 0 | 0 | 20 | 35 | 120 | 75 | 75 |
| 11 | 0 | 0 | 0 | 15 | 55 | 60 | 80 | 130 | 60 |
| 12 | 0 | 0 | 0 | 5 | 20 | 50 | 60 | 110 | 50 |

FIG. 12

| | | LENS POSITION | | | | | | | | |
| --- | --- | --- | --- | --- | --- | --- | --- | --- | --- | --- |
| | | FAR | | | | | | | | NEAR |
| | | 0 | 5 | 10 | 15 | 20 | 25 | 30 | 35 | 40 |
| POINT | 1 | 0 | 10 | 20 | 40 | 100 | 30 | 10 | 0 | 0 |
| | 2 | 0 | 15 | 30 | 45 | 150 | 35 | 15 | 0 | 0 |
| | 3 | 0 | 10 | 25 | 50 | 120 | 30 | 10 | 0 | 0 |
| | 4 | 0 | 10 | 30 | 40 | 150 | 20 | 5 | 0 | 0 |
| | 5 | 0 | 20 | 35 | 60 | 120 | 55 | 25 | 5 | 0 |
| | 6 | 0 | 10 | 20 | 35 | 130 | 15 | 0 | 0 | 0 |
| | 7 | 0 | 10 | 25 | 50 | 125 | 30 | 5 | 0 | 0 |
| | 8 | 0 | 20 | 25 | 55 | 155 | 40 | 15 | 0 | 0 |
| | 9 | 0 | 0 | 0 | 0 | 0 | 15 | 40 | 150 | 50 |
| | 10 | 0 | 0 | 0 | 0 | 0 | 25 | 35 | 120 | 75 |
| | 11 | 0 | 0 | 0 | 15 | 55 | 60 | 80 | 130 | 60 |
| | 12 | 0 | 0 | 0 | 5 | 20 | 50 | 60 | 110 | 50 |

FIG. 13

| | | LENS POSITION | | | | | | | |
| --- | --- | --- | --- | --- | --- | --- | --- | --- | --- |
| | | FAR | | | | | | | NEAR |
| | | 0 | 5 | 10 | 15 | 20 | 25 | 30 | 35 | 40 |
| POINT | 1 | 0 | 10 | 20 | 40 | 100 | 30 | 10 | 0 | 0 |
| | 2 | 0 | 0 | 15 | 30 | 45 | 150 | 35 | 15 | 0 |
| | 3 | 0 | 10 | 25 | 50 | 120 | 30 | 10 | 0 | 0 |
| | 4 | 0 | 10 | 30 | 40 | 150 | 20 | 5 | 0 | 0 |
| | 5 | 0 | 20 | 35 | 60 | 120 | 55 | 25 | 5 | 0 |
| | 6 | 10 | 20 | 35 | 130 | 15 | 0 | 0 | 0 | 0 |
| | 7 | 0 | 10 | 25 | 50 | 125 | 30 | 5 | 0 | 0 |
| | 8 | 0 | 20 | 25 | 55 | 155 | 40 | 15 | 0 | 0 |
| | 9 | 0 | 0 | 0 | 0 | 0 | 15 | 40 | 150 | 50 |
| | 10 | 0 | 0 | 0 | 0 | 20 | 35 | 120 | 75 | 75 |
| | 11 | 0 | 0 | 0 | 15 | 55 | 60 | 80 | 130 | 60 |
| | 12 | 0 | 0 | 0 | 5 | 20 | 50 | 60 | 110 | 50 |

FIG. 15

| 6 | 6 | 6 | 6 | 6 | 6 | 3 | 2 | 2 | 2 |
|---|---|---|---|---|---|---|---|---|---|
| 6 | 6 | 6 | 6 | 6 | 6 | 2 | 2 | 2 | 2 |
| 6 | 6 | 6 | 6 | 6 | 5 | 6 | 2 | 2 | 2 |
| 6 | 6 | 6 | 6 | 6 | 4 | 3 | 6 | 6 | 6 |
| 6 | 6 | 6 | 6 | 6 | 6 | 7 | 6 | 6 | 6 |
| 4 | 6 | 6 | 6 | 6 | 6 | 6 | 6 | 6 | 6 |
| 4 | 4 | 6 | 6 | 6 | 6 | 6 | 6 | 6 | 6 |
| 4 | 4 | 4 | 4 | 6 | 6 | 6 | 6 | 6 | 6 |
| 4 | 4 | 4 | 6 | 6 | 6 | 6 | 6 | 6 | 6 |
| 4 | 4 | 4 | 6 | 6 | 6 | 6 | 6 | 6 | 6 |
| 4 | 4 | 5 | 6 | 6 | 6 | 6 | 6 | 6 | 6 |

IMAGE PROCESSING APPARATUS HAVING A CANDIDATE FOCUS POSITION EXTRACTING PORTION AND CORRESPONDING FOCUS ADJUSTING METHOD

CROSS-REFERENCE TO RELATED APPLICATIONS

The present application claims foreign priority based on Japanese Patent Application No. 2011-256012, filed Nov. 24, 2011, the contents of which is incorporated herein by reference.

BACKGROUND OF THE INVENTION

1. Field of the Invention

The present invention relates to an image processing apparatus, a focus adjusting method, and a computer program, which are capable of extracting a plurality of candidate focus positions and selecting an optimum focus position among the plurality of extracted candidate focus positions while viewing those positions.

2. Description of Related Art

In the case of inspecting whether or not a defect is present in an inspection object, an appearance of the inspection object is imaged by an imaging device to determine whether or not the defect is present based on the imaged image. Proper determination of the presence of the defect requires the imaged image to be clear, and normally, the inspection object is imaged after focus adjustment is performed. Manual adjustment or automatic adjustment is performed as the focus adjustment, where the automatic adjustment is easier to use for the user.

In the case of automatically performing the focus adjustment, an adjustment region such as a rectangular region or a circular region for adjusting a focus is set, and the focus degree of each of imaged images with regard to an inspection object imaged within the set adjustment region is evaluated, to extract a position with the highest focus degree as a focus position. For example, Japanese Unexamined Patent Publication No. 2007-316432 discloses an enlarging observation device for calculating focus values each indicating the degree of focus by an imaging unit to extract a maximum focus value which is a focus value being maximal, and moving the imaging unit to a maximum focus position corresponding to the maximum focus value, to thereby adjust a subject distance from the imaging unit to the inspection object.

The focus degree has hitherto been evaluated based on a quantity of high-frequency components of image data. That is, it has been evaluated that a position with a larger quantity of high-frequency components being within the set adjustment region is more focused, and a position with a smaller quantity of higher-frequency component is less focused.

However, in the case of extracting the high-frequency component only within the set adjustment region, there may occur a case where an unintended evaluation is made due to an influence of a size of the adjustment region or an influence of blurring on the periphery of the adjustment region. FIGS. 1A and 1B are schematic views for describing a problem of the conventional evaluation of the focus degree.

As shown in FIG. 1A, in a so-called non-focused state in which the image is not focused, a blurred portion 501 is present on the periphery of a characteristic portion 500 of the inspection object, as compared with a so-called focused state in which the image is focused, shown in FIG. 1B. When an adjustment region 502 is set in this state, the background color is one in the focused state of FIG. 1B, whereas a color different from the background color is mixed due to the presence of the blurred portion 501 in the non-focused state of FIG. 1A. As a result, the quantity of high-frequency components is likely to be determined to be larger than that in FIG. 1B, and hence the focus degree might be wrongly recognized as higher in the non-focused state shown in FIG. 1A.

Further, in the non-focused state shown in FIG. 1A, since the image becomes an image including the blurred portion 501 being present at the periphery of the characteristic portion 500 of the inspection object, setting of an appropriate adjustment region 502 itself is difficult. That is, in the case of the blurred portion 501 being present, it may not be possible to properly perform the focus adjustment depending on setting of the window (adjustment region). Moreover, "requiring the focus adjustment" means the image is not focused, and since the user is made to perform an operation for setting the window (adjustment region) on the non-focused image, setting of the window (adjustment region) has become more difficult.

SUMMARY OF THE INVENTION

The present invention has been made in view of the above problems, and an object thereof is to provide an image processing apparatus, a focus adjusting method, and a computer program, which are capable of easily selecting an optimum focus position for an inspection object even when a plurality of candidate focus positions are present.

In order to achieve the above object, according to one embodiment of the invention, an image processing apparatus includes: an imaging unit (a imaging portion) for imaging an imaged region including an inspection object; a display unit (a display portion) for displaying an image imaged by the imaging unit; a focus adjusting unit (a focus adjusting portion) having a focus adjustment mechanism for adjusting a focus position with respect to the inspection object; and an image processing unit (an image processing portion) for executing image processing on image data captured (acquired) by imaging with the imaging unit, wherein the focus adjusting unit includes a candidate focus position extracting portion for extracting as candidate focus positions a plurality of positions where part of the imaged region comes into a focused state based on a plurality of pieces of different image data captured by imaging the inspection object by the imaging unit, while changing the focus position with respect to the inspection object by the focus adjustment mechanism, and a candidate displaying portion for displaying candidate focus position information concerning the plurality of extracted candidate focus positions in the display unit.

Further, according to another embodiment of the invention, in the image processing apparatus according to the first aspect, the candidate displaying portion displays in the display unit the candidate focus position information concerning the plurality of extracted candidate focus positions so as to be selectable by the user, the focus adjusting unit is provided with a selection accepting portion for accepting selection of one candidate focus position among the plurality of candidate focus positions displayed in the display unit, and when the selection of one candidate focus position is accepted by the selection accepting portion, the focus adjusting unit displays in the display unit an image in which the focus position is adjusted to the at least one candidate focus position, the selection of which has been accepted.

Further, according to still another embodiment of the invention, in the image processing apparatus according to the first or second aspect, the focus adjusting unit is provided with a selection accepting portion for accepting selection of one candidate focus position among the plurality of extracted candidate focus positions, and when the selection of one candidate focus position is accepted by the selection accepting portion, the focus adjusting unit adjusts the focus position to the one candidate focus position, the selection of which has been accepted.

Further, according to still another embodiment of the invention, in the image processing apparatus according to the first or second aspect, the focus adjusting unit is provided with a selection accepting portion for accepting selection of one candidate focus position, and when the selection of one candidate focus position is accepted by the selection accepting portion, the candidate displaying portion displays in the display unit an image imaged upon adjusting the focus position to the one candidate focus position, the selection of which has been accepted.

Further, according to still another embodiment of the invention, in the image processing apparatus according to the first or second aspect, the candidate displaying portion displays in the display unit a candidate focus position having a shortest distance from the imaging unit among the plurality of candidate focus positions.

Further, according to still another embodiment of the invention, in the image processing apparatus according to any one of the first to fifth aspects, the focus adjusting unit is provided with a focus degree calculation portion for calculating a focus degree for indicating a degree of a focused state with regard to each of a plurality of previously set small regions, and a focus position acquiring portion for acquiring a focus position with a maximum focus degree among the focused degrees each calculated for each of the small regions, and the candidate focus position extracting portion extracts the candidate focus positions based on the acquired focus position for each of the small regions.

Next, in order to achieve the above object, according to still another embodiment of the invention, there is provided a focus adjusting method executable by an image processing apparatus, the apparatus including: an imaging unit for imaging an imaged region including an inspection object; a display unit for displaying an image imaged by the imaging unit; a focus adjusting unit having a focus adjustment mechanism for adjusting a focus position with respect to the inspection object; and an image processing unit for executing image processing on image data captured by imaging with the imaging unit, wherein the focus adjusting unit extracts as candidate focus positions a plurality of positions where part of the imaged region comes into a focused state based on a plurality of pieces of different image data captured by imaging the inspection object by the imaging unit, while changing the focus position with respect to the inspection object by the focus adjustment mechanism, and displays candidate focus position information concerning the plurality of extracted candidate focus positions in the display unit.

Further, according to still another embodiment of the invention, in the focus adjusting method according to the seventh aspect, the candidate focus position information concerning the plurality of extracted candidate focus positions are displayed in the display unit so as to be selectable by the user in the display unit, the focus adjusting unit accepts selection of one candidate focus position among the plurality of candidate focus positions displayed in the display unit, and when the selection of one candidate focus position is accepted, the focus adjusting unit displays in the display unit an image in which the focus position is adjusted to at least one candidate focus position, the selection of which has been accepted.

Further, according to still another embodiment of the invention, in the focus adjusting method according to the seventh or eighth aspect, the focus adjusting unit accepts selection of one candidate focus position among the plurality of extracted candidate focus positions, and when the selection of one candidate focus position is accepted, the focus adjusting unit adjusts the focus position to the one candidate focus position, the selection of which has been accepted.

Further, according to still another embodiment of the invention, in the focus adjusting method according to the seventh or eighth aspect, the focus adjusting unit accepts selection of one candidate focus position, and when the selection of one candidate focus position is accepted, the focus adjusting unit displays in the display unit an image imaged upon adjusting the focus position to the one candidate focus position, the selection of which has been accepted.

Further, according to still another embodiment of the invention, in the focus adjusting method according to the seventh or eighth aspect, the candidate displaying portion displays in the display unit a candidate focus position having a shortest distance from the imaging unit among the plurality of candidate focus positions.

Further, according to still another embodiment of the invention, in the focus adjusting method according to any one of the seventh to eleventh aspects, the focus adjusting unit calculates the focus degree for indicating the degree of a focused state with regard to each of a plurality of previously set small regions, acquires a focus position with a maximum focus degree among the focused degrees each calculated for each of the small regions, and extracts the candidate focus positions based on the acquired focus position for each of the small regions.

Next, in order to achieve the above object, according to still another embodiment of the invention, there is provided a computer program executable by an image processing apparatus, the apparatus including: an imaging unit for imaging an imaged region including an inspection object; a display unit for displaying an image imaged by the imaging unit; a focus adjusting unit having a focus adjustment mechanism for adjusting a focus position with respect to the inspection object; and an image processing unit for executing image processing on image data captured by imaging with the imaging unit, wherein the focus adjusting unit is caused to function as a candidate focus position extracting portion for extracting as candidate focus positions a plurality of positions where part of the imaged region comes into a focused state based on a plurality of pieces of different image data captured by imaging the inspection object by the imaging unit, while changing the focus position with respect to the inspection object by the focus adjustment mechanism, and a candidate displaying portion for displaying candidate focus position information concerning the plurality of extracted candidate focus positions in the display unit.

Further, according to still another embodiment of the invention, in the computer program according to the thirteenth aspect, the candidate displaying portion is caused to function as a unit for displaying in the display unit the candidate focus position information concerning the plurality of extracted candidate focus positions so as to be selectable by the user in the display unit, the focus adjusting unit is caused to function as a selection accepting portion for accepting selection of one candidate focus position among the plurality of candidate focus positions displayed in the display unit, and when the selection of one candidate focus position is accepted, the focus adjusting unit is caused to function as a unit for displaying in the display unit an image in which the focus position is adjusted to the at least one candidate focus position, the selection of which has been accepted.

Further, according to still another embodiment of the invention, in the computer program according to the thirteenth or fourteenth aspect, the focus adjusting unit is caused to function as a selection accepting portion for accepting selection of one candidate focus position among the plurality of extracted candidate focus positions, and when the selection of one candidate focus position is accepted, the focus adjusting unit is caused to function as a unit for adjusting the focus position to the one candidate focus position, the selection of which has been accepted.

Further, according to still another embodiment of the invention, in the computer program according to the thirteenth or fourteenth aspect, the focus adjusting unit is caused to function as a selection accepting portion for accepting selection of one candidate focus position, and when the selection of one candidate focus position is accepted, the candidate displaying portion is caused to function as a unit for displaying in the display unit an image imaged upon adjusting the focus position to the one candidate focus position, the selection of which has been accepted.

Further, according to still another embodiment of the invention, in the computer program according to the thirteenth or fourteenth aspect, the candidate displaying portion is caused to function as a unit for displaying in the display unit a candidate focus position having a shortest distance from the imaging unit among the plurality of candidate focus positions.

Further, according to still another embodiment of the invention, in the computer program according to any one of the thirteenth to seventeenth aspects, the focus adjusting unit is caused to function as a focus degree calculation portion for calculating the focus degree for indicating the degree of a focused state with regard to each of a plurality of previously set small regions, and a focus position acquiring portion for acquiring a focus position with a maximum focus degree among the focused degrees each calculated for each of the small regions, and the candidate focus position extracting portion is caused to function as a unit for extracting the candidate focus positions based on the acquired focus position for each of the small regions.

In the first, seventh, and thirteenth aspects, a plurality of positions where part of the imaged region comes into a focused state are extracted as candidate focus positions based on a plurality of pieces of different image data captured by imaging the inspection object by the imaging unit, while the focus position with respect to the inspection object is changed by the focus adjustment mechanism. Candidate focus position information concerning the plurality of extracted candidate focus positions is displayed in the display unit. A plurality of candidate focus positions are extracted and focus adjustment can be performed while checking on a screen as to which part of the imaged region is in a focused state. Accordingly, it is possible for the user to easily select a focus position corresponding to an image in which a desired characteristic portion of the inspection object is clear.

In the second, eighth, and fourteenth aspects, the candidate focus position information concerning the plurality of extracted candidate focus positions are displayed in the display unit so as to be selectable by the user in the display unit, selection of one candidate focus position is accepted among the plurality of candidate focus positions displayed in the display unit, and when the selection of one candidate focus position is accepted, an image in which the focus position is adjusted to the at least one candidate focus position, the selection of which has been accepted, is displayed in the display unit. Accordingly, it is possible to display an image corresponding to the candidate focus position, so as to visually check whether or not the selected imaged region is proper.

In the third, ninth, and fifteenth aspects, selection of one candidate focus position is accepted among the plurality of extracted candidate focus positions, and when the selection of one candidate focus position is accepted, the focus position is adjusted to the one candidate focus position, the selection of which has been accepted. Accordingly, it is possible to display an image corresponding to the candidate focus position, so as to visually check whether or not the selected imaged region is proper.

In the fourth, tenth, and sixteenth aspects, an image imaged upon adjusting the focus position to one candidate focus position, the selection of which has been accepted, is displayed in the display unit. Accordingly, it is possible to visually check whether or not a desired characteristic portion of the inspection object is clear, so as to easily select a focus position corresponding to a desired imaged region.

In the fifth, eleventh, and seventeenth aspects, a candidate focus position having a shortest distance from the imaging unit among the plurality of candidate focus positions is displayed in the display unit. Since a candidate focus position, which has a shortest distance from the imaging unit and most likely to come into the focused state, is displayed, there is a high probability that the focus adjustment becomes unnecessary, and a complicated operation can be omitted in some cases.

In the sixth, twelfth, and eighteenth aspects, the focus degree for indicating the degree of a focused state with regard to each of a plurality of previously set small regions is calculated, to acquire a focus position with a maximum focus degree among the focused degrees each calculated for each of the small regions. Since the candidate focus positions are extracted based on the acquired focus position for each of the small regions, it is possible to extract a candidate focus position likely to come into the focused state.

In the present invention, a plurality of candidate focus positions are extracted and focus adjustment can be performed while checking on a screen as to which part of the imaged region is in a focused state. Accordingly, it is possible for the user to easily select a focus position corresponding to an image in which a desired characteristic portion of the inspection object is clear.

BRIEF DESCRIPTION OF THE DRAWINGS

FIG. 12 is a table for describing a candidate focus position extracting method based on a calculated focus degree, performed by the image processing sensor according to the embodiment of the present invention;

FIG. 13 is a table for describing a candidate focus position extracting method in a case where the calculated focus degree varies, the method being performed by the image processing sensor according to the embodiment of the present invention.

FIG. 15 is an exemplary view showing arrangement of the focus degrees, representing for each pixel an image number of the high-frequency extracted image with a maximum focus degree;

DETAILED DESCRIPTION OF PREFERRED EMBODIMENTS

Figure 1B:
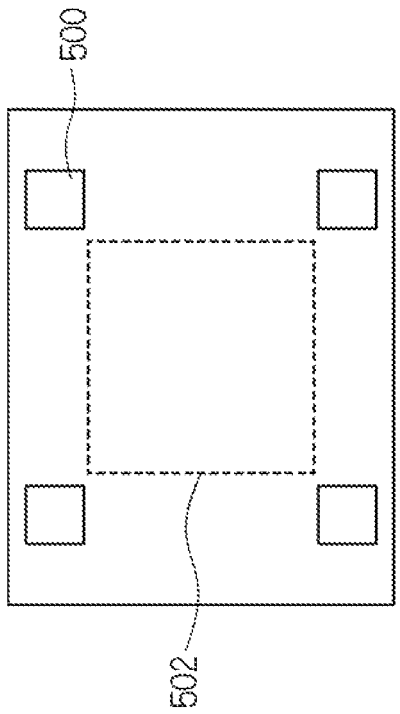
FIGS. 1A and 1B are schematic views for describing a problem of a conventional evaluation of a focus degree.

Hereinafter, an image processing apparatus according to an embodiment of the present invention will be described with reference to the drawings. It is to be noted that elements having the same or similar configurations or functions throughout the drawings referenced in descriptions of the present embodiment are provided with the same or similar reference numerals, and detailed descriptions thereof are omitted. Hereinafter, descriptions will be made, giving a case of a processing sensor as an image processing apparatus.

Figure 2:
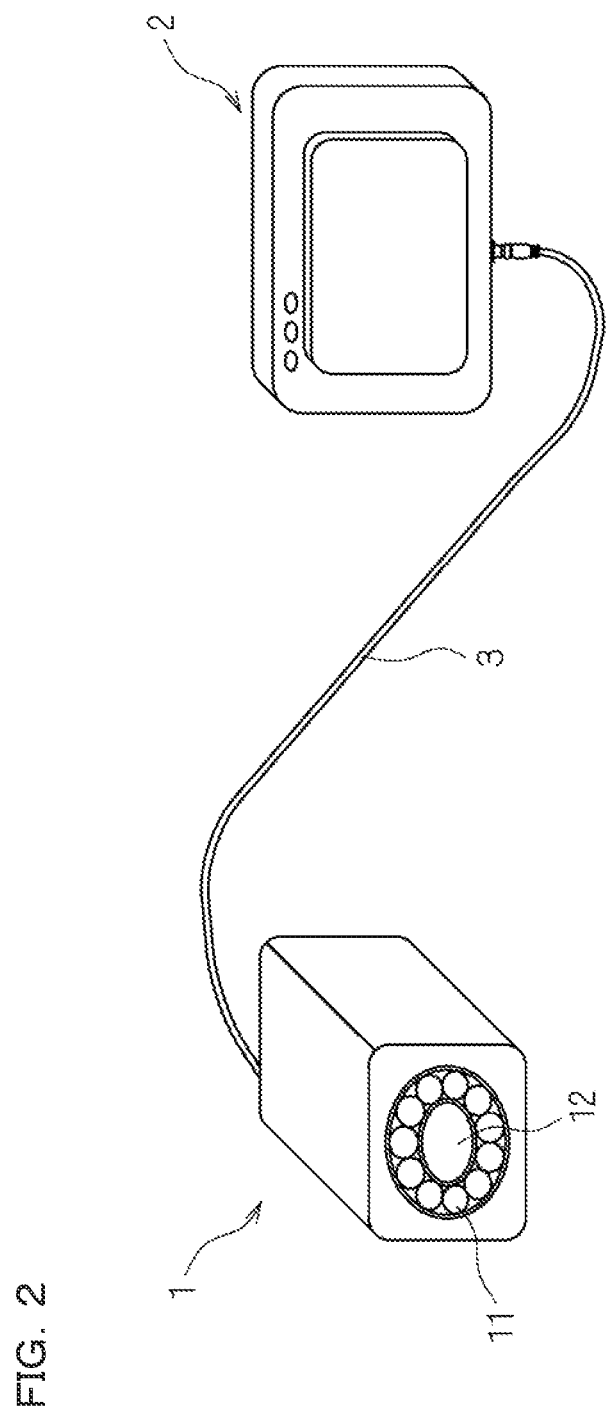
FIG. 2 is a schematic view showing a configuration of an image processing sensor according to an embodiment of the present invention.

FIG. 2 is a schematic view showing a configuration of an image processing sensor according to an embodiment of the present invention. As shown in FIG. 2, the image processing sensor according to the present embodiment is configured by an imaging device 1 and a display device 2 connected with the imaging device 1 through a connection cable 3 in a data communicable manner.

Needless to say, the image processing sensor may be an external computer having a display in place of the display device 2. The imaging device 1 and the display device 2 may be integrally formed.

Figure 1A:
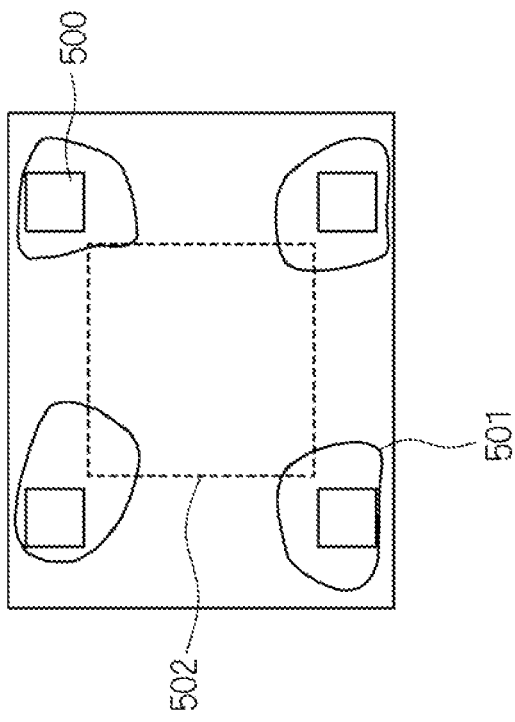

The imaging device 1 includes therein an FPGA, DSP, and the like which execute image processing, and provided with a camera module (imaging unit) having an imaging element for imaging an inspection object, and an illumination part for irradiating the inspection object with light. In order to make the imaging device 1 compact, for example, as shown in FIG. 1, a lens 12 is arranged close to the center of the front face of the imaging device 1, and a plurality of LEDs 11 are arranged as the illumination part so as to surround the periphery of the lens 12. It is to be noted that external illumination (ring illumination, or the like) may be provided separately from the imaging device 1.

Figure 3A:
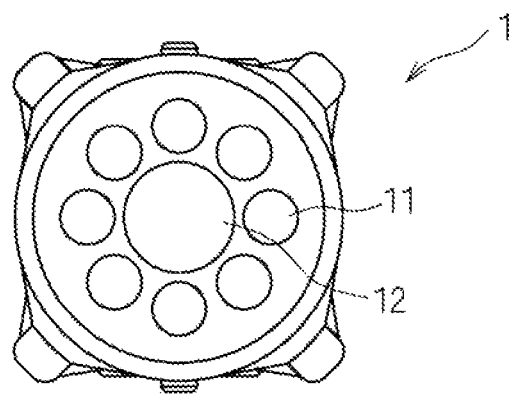
FIGS. 3A to 3C are outline views showing a configuration of an imaging device of the image processing sensor according to the embodiment of the present invention.
Figure 3B:
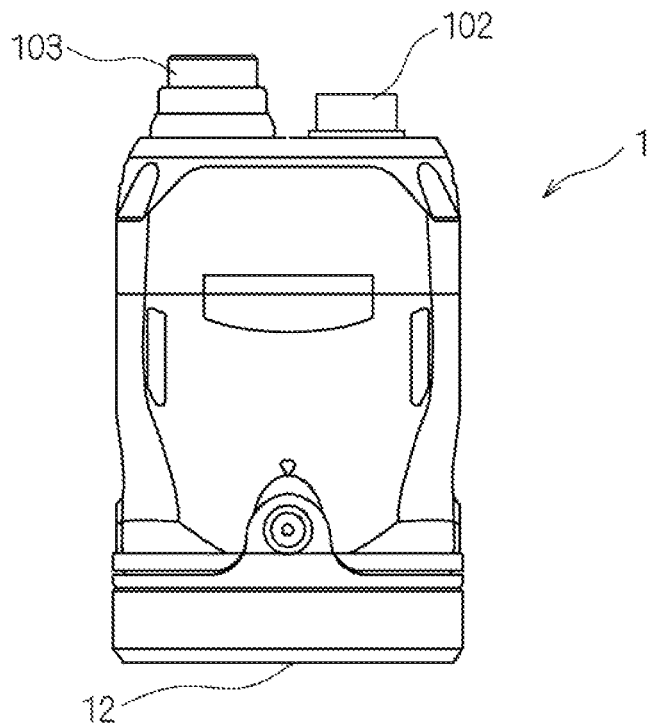
Figure 3C:
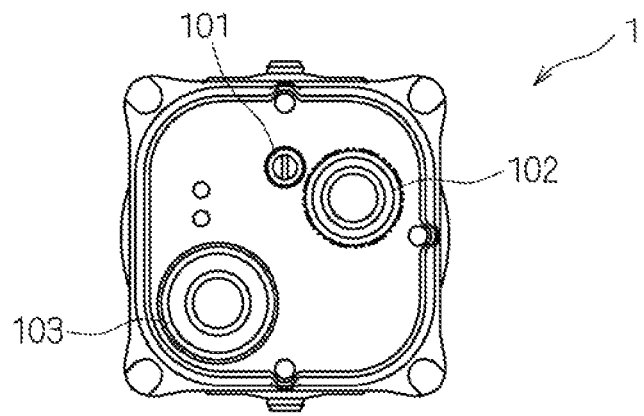

FIGS. 3A to 3C are outline views showing a configuration of the imaging device 1 of the image processing sensor according to the embodiment of the present invention. FIG. 3A is a front view showing the configuration of the imaging device 1 of the image processing sensor according to the embodiment of the present invention, FIG. 3B is a plan view showing the configuration of the imaging device 1 of the image processing sensor according to the embodiment of the present invention, and FIG. 3C is a rear view showing the configuration of the imaging device 1 of the image processing sensor according to the embodiment of the present.

As shown in FIG. 3A, the lens 12 is arranged close to the center of the front face of the imaging device 1, and the plurality of LEDs 11 are arranged so as to surround the periphery of the lens 12. At the time of imaging, the plurality of LEDs 11 are turned on, to irradiate an imaged region including the inspection object with light, thereby allowing clear imaging of the imaged region including the inspection object.

As shown in FIGS. 3B and 3C, the imaging device 1 includes, on its rear face, a power source connector 102 to be connected with a power cable that receives supply of electric power from an external power source, and a connection connector 103 connectable with the connection cable 3 that performs data communication with the display device 2. Further, the imaging device 1 also includes, on the rear face, a focus adjusting screw 101 capable of manually adjusting a focus.

Figure 4:
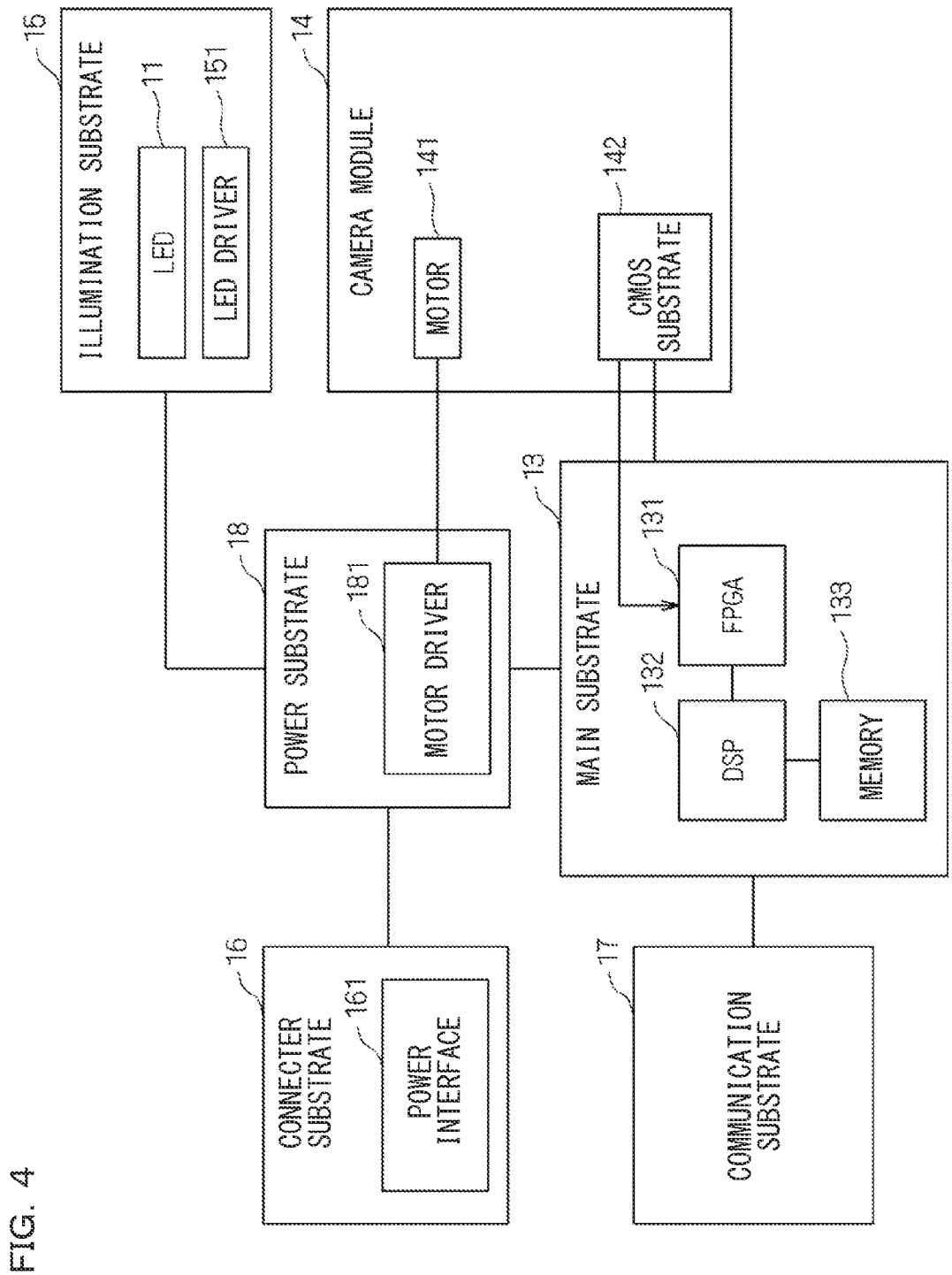
FIG. 4 is a block diagram showing a hardware configuration of the imaging device of the image processing sensor according to the embodiment of the present invention.

FIG. 4 is a block diagram showing a hardware configuration of the imaging device 1 of the image processing sensor according to the embodiment of the present invention. In FIG. 4, a connector substrate 16 receives supply of electric power from the external power source via the power source connector 102 (see FIGS. 3B and 3C) provided in a power interface 161. A power substrate 18 supplies the supplied electric power to each substrate. In the present embodiment, electric power is supplied to a camera module 14 via a main substrate 13.

A motor driver 181 of the power substrate 18 supplies drive electric power to a motor 141 of the camera module 14, to realize auto focusing. That is, the motor driver 181 and the motor 141 function as an example of the focus adjustment mechanism.

A communication substrate 17 transmits to the display device 2 an OK/NG signal (determination signal) outputted from the main substrate 13 and indicating failure/non-failure of the inspection object in accordance with whether or not a defect has been detected. The display device 2 having received the determination signal displays a result of the determination.

An illumination substrate (illumination part) 15 irradiates the imaged region for imaging the inspection object. An illumination substrate 15 is provided with the plurality of LEDs 11, and is provided with a reflector (not shown), on the front of the plurality of LEDs 11. Further, the lens 12 is interchangeable as a lens unit for a short distance or a long distance.

The camera module (imaging unit) 14 is provided with a focus adjustment part for controlling the auto focus motion by rotation of the motor 141, and after focus adjustment, the camera module 14 images the inspection object in accordance with an imaging instruction signal from the main substrate 13. In the present embodiment, a CMOS substrate 142 is provided as an imaging element, and an imaged color image is converted to an HDR image based on a conversion characteristic for expanding a dynamic range on the CMOS substrate 142, and is outputted to the FPGA 131 of the main substrate 13. That is, the CMOS substrate 142 is provided with a function to generate and output the HDR image, and for example, an HDRCMOS or the like corresponds to this. In the imaging device 1 of the image processing sensor, the switching part may be provided for switching between whether or not to convert the image to the HDR image with the CMOS substrate. When a workpiece resistant to occurrence of halation and the like is carried in the case of imaging the inspection object, the switching part can make switching so as not to generate the HDR image, and can further alleviate an arithmetic processing load.

Figure 5:
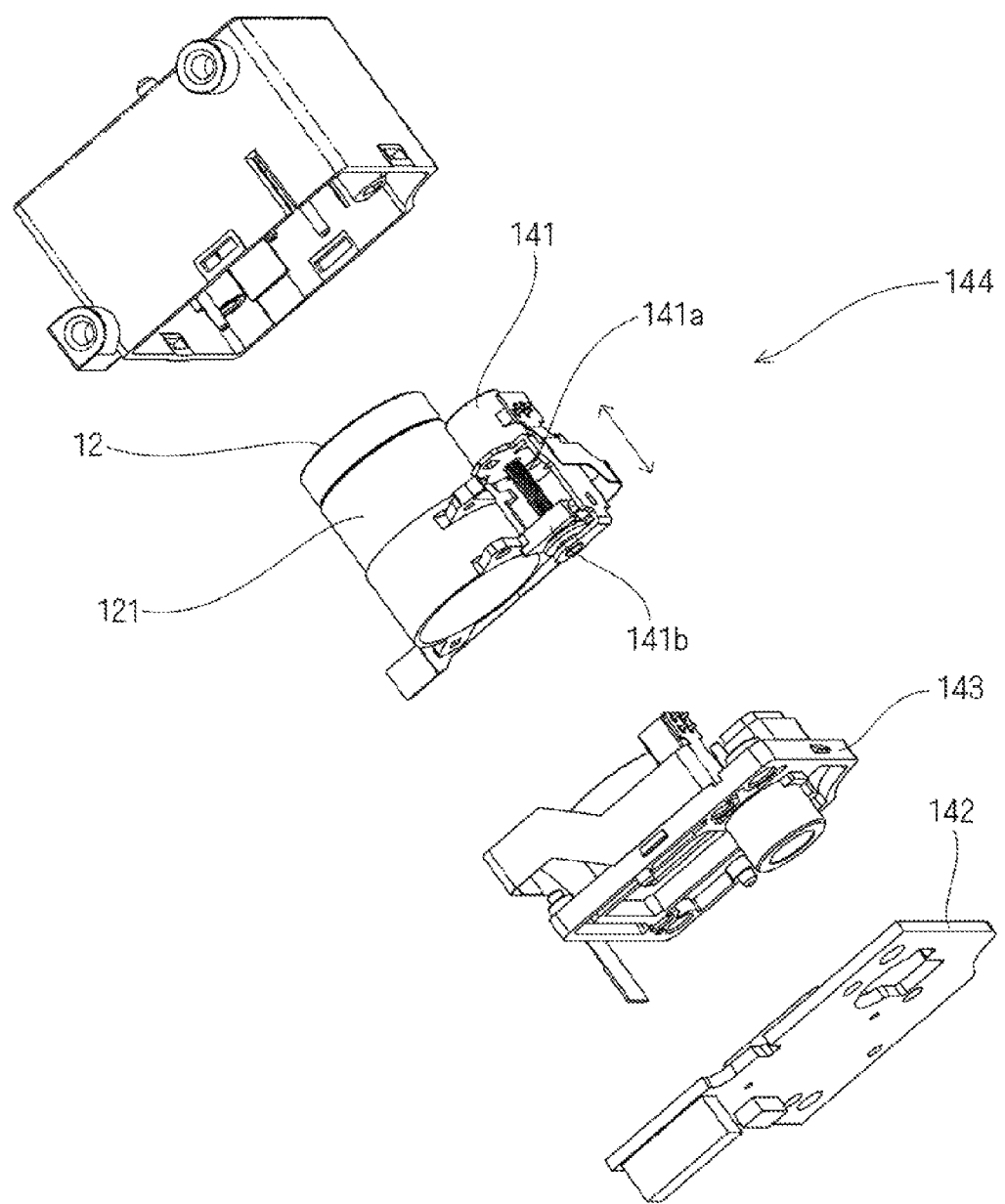
FIG. 5 is a perspective view showing a configuration of a focus adjustment mechanism of a camera module in the imaging device of the image processing sensor according to the embodiment of the present invention.

FIG. 5 is a perspective view showing a configuration of the focus adjustment mechanism of the camera module 14 in the imaging device 1 of the image processing sensor according to the embodiment of the present invention. As shown in FIG. 5, a base mount 143 is mounted on the CMOS substrate 142 of the camera module 14. The base mount 143 is provided with a vertical detection sensor (not illustrated) that detects a motion in a vertical direction (arrow direction) of a lens support 121 that supports the lens 12 in a lens holder 144, and a rotation detection sensor (not illustrated) that detects a rotation of the motor 141 as part of a mechanism to move the lens support 121.

The base mount 143 is mounted with the lens holder 144 configured by the lens support 121 and the mechanism to move the lens support 121. As shown in FIG. 5 an external thread formed at a rotational shaft 141*a* of the motor 141 is screwed with an internal thread formed at a nut 141*b*. Hence, the nut 141*b* linearly moves in the arrow direction in accordance with the rotation of the motor 141. The nut 141*b* is arranged so as to push up the lens support 121 from below, and the lens support 121 is pushed down to below by a biasing member (not shown). Accordingly, by controlling a reciprocating motion in the arrow direction of the nut 141*b* by rotation of the motor 141, the lens support 121 can be raised or lowered against the biasing force of the biasing member by means of the nut 141*b*, whereby a distance between the lens 12 provided in the lens support 121 and the inspection object can be adjusted.

Returning to FIG. 4, the main substrate 13 controls a motion of each substrate having been connected therewith. For example, with respect to the illumination substrate 15, a control signal for controlling turning-on/off of the plurality of LEDs 11 is transmitted to an LED driver 151. The LED driver 151, for example, adjusts turning on/off, an amount of light, and the like, of the LEDs 11 in accordance with the control signal from the FPGA 131. Further, a control signal for controlling an auto focusing operation is transmitted to the motor 141 of the camera module 14 via a motor driver 181 of the power substrate 18, and an imaging instruction signal or the like is transmitted to the CMOS substrate 142.

While performing illumination control and imaging control, the FPGA 131 of the main substrate 13 executes image processing on the captured image data (image processing unit). Further, a DSP 132 of the main substrate 13 executes edge detection processing, pattern search processing, and the like on the image data. As a result of the pattern search processing, an OK/NG signal (determination signal), indicating failure/non-failure of the inspection object in accordance with whether or not a defect has been detected is outputted to the communication substrate 17. A result of the arithmetic processing and the like are stored into a memory 133. In the present embodiment, processing with a relatively heavy load, such as the edge detection processing or the pattern search processing, is executed by the DSP 132. However, the processing may be executed by the FPGA 131 depending on the situation. In short, the image processing unit is sufficient as long as some kind of image processing can be executed on image data captured by the CMOS substrate 142.

Further, although the FPGA 131 performs illumination control, imaging control, and the like in the present embodiment, the DSP 132 may perform the illumination control, the imaging control, and the like. Moreover, a circuit formed of the FPGA 131 united with the DSP 132, namely, a main control circuit (main control unit), may be provided. In short, the main control unit transmits the control signal for controlling turning-on/off of the plurality of LEDs 11 to the LED driver 151, transmits the control signal for controlling an auto focus motion to the motor 141 of the camera module 14 via the motor driver 181 of the power substrate 18, transmits the imaging instruction signal or the like to the CMOS substrate 142, and has both functions of the FPGA 131 and the DSP 132.

Figure 6:
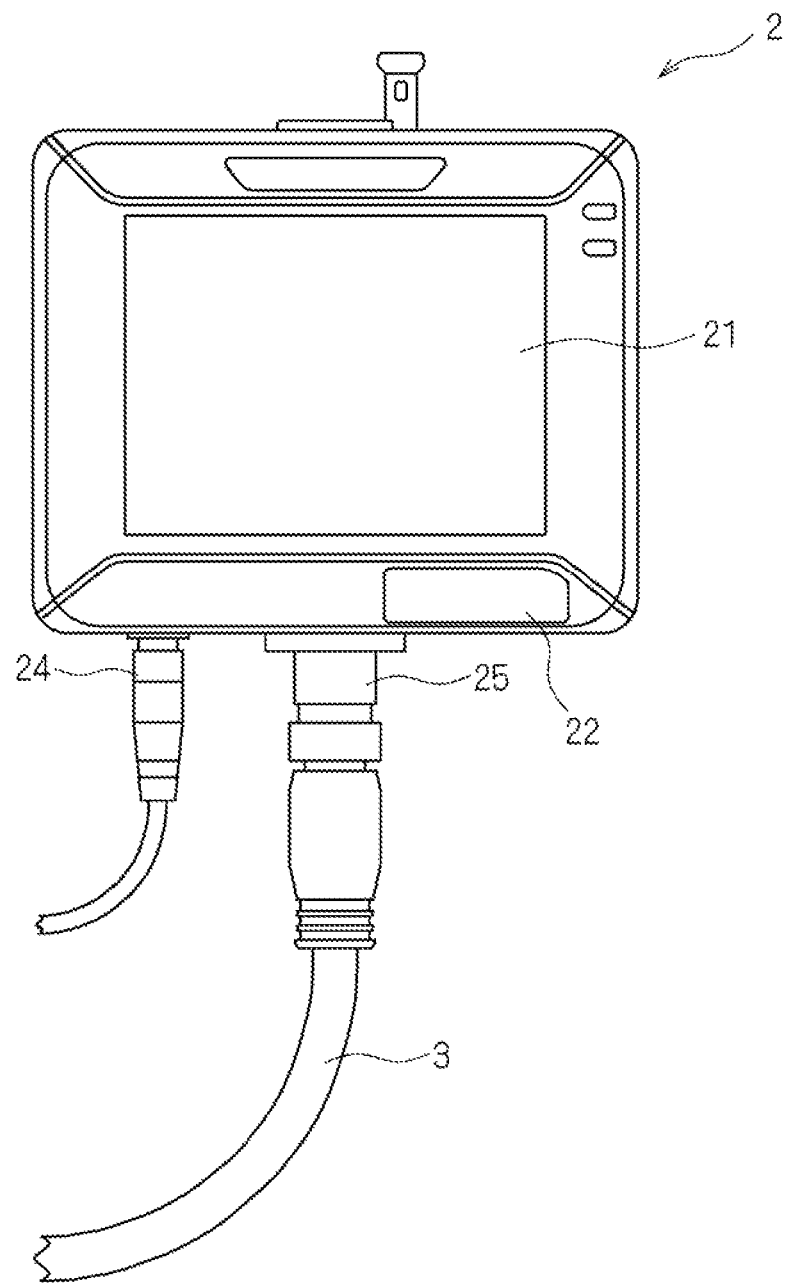
FIG. 6 is a front view showing a configuration of a display device of the image processing sensor according to the embodiment of the present invention.

FIG. 6 is a front view showing a configuration of the display device 2 of the image processing sensor according to the embodiment of the present invention. As shown in FIG. 6, a touch panel 21 is provided at the center portion of the front face of the display device 2, and displays a color image of an imaged inspection object on the screen, while accepting a selection input by the user.

Further, the display device 2 is provided with a power connector 24 to be connected with the power cable supplied with electric power from the external power source, and a connection connector 25 connectable with the connection cable 3 that performs data communication with the imaging device 1. Moreover, a USB port 22 connectable with a USB memory and the like is provided on the front face.

Figure 7A:
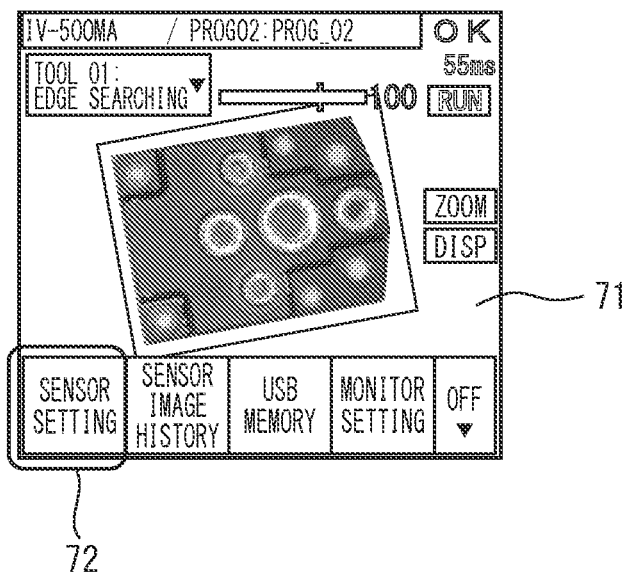
FIGS. 7A and 7B are exemplary views of mode switching screens in the display device of the image processing sensor according to the embodiment of the present invention.
Figure 7B:
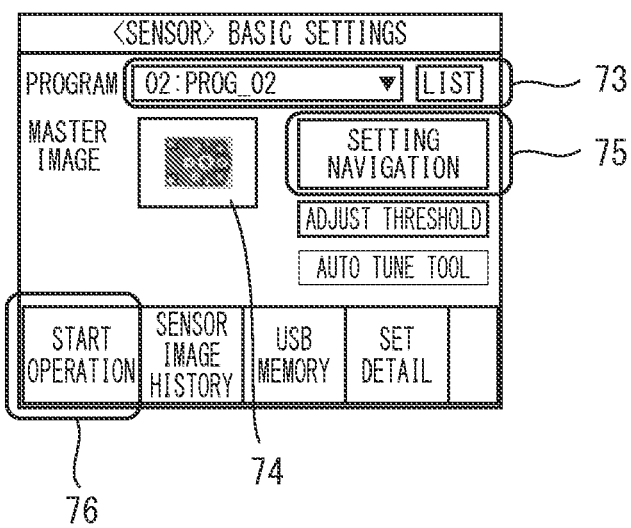

The user selects a button displayed on the screen of the touch panel 21 of the display device 2, to thereby control an operation of the image processing sensor. It is also possible to switch between "inspection mode" for executing an inspection of the inspection object and "setting mode" for performing a condition setting for the imaging device 1. In other words, the image processing sensor according to the present embodiment has a mode switching part for switching between the inspection mode (Run mode) for determining failure/non-failure of the inspection object and the setting mode (Non-Run mode) for setting a variety of parameters (imaging parameter, illumination parameter, image processing parameter, and the like) which are used for the inspection. FIGS. 7A and 7B are exemplary views of mode switching screens in the display device 2 of the image processing sensor according to the embodiment of the present invention.

FIG. 7A is an exemplary view of a screen display of "inspection mode". As shown in FIG. 7A, an image of the inspection object imaged by the imaging device 1 is displayed in an inspection object displaying region 71. A "SENSOR SETTING" button 72 at the lower left functions as the switching part, and when the "SENSOR SETTING" button 72 is selected, the mode is switched to "setting mode", and the screen transitions to the screen shown in FIG. 7B.

FIG. 7B is an exemplary view of a screen display of "setting mode". As shown in FIG. 7B, the kind of the inspection object is selected in a program selecting region 73. Herein, the "program" means a series of data groups (combination of parameter values) set in accordance with the kind of the inspection object or an inspection environment, and a different data group can be stored as the program for each kind of the inspection object. Inspection condition data concerning a condition for inspecting the inspection object includes focus position data indicating a focus position in the case of performing focus adjustment.

Further, when a master image to become a reference for comparison with the inspection object is stored, the master image is displayed in a master image displaying region 74. When a "SETTING NAVIGATION" button 75 is selected, the screen transitions to a setting screen for performing detailed setting. A "START OPERATION" button 76 of FIG. 7B functions as a switching unit, and when the "START OPERATION" button 76 is selected, the mode is switched to the "inspection mode", and the screen transitions to the screen shown in FIG. 7A.

Figure 8A:
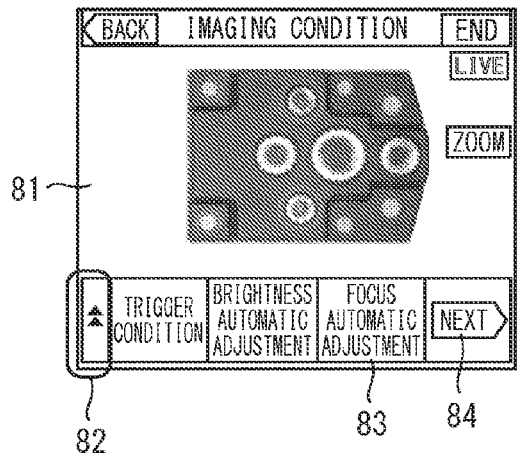
FIGS. 8A to 8F are exemplary views of setting screens in the display device of the image processing sensor according to the embodiment of the present invention.
Figure 8B:
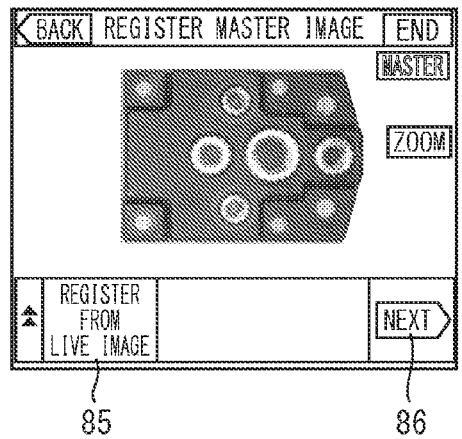
Figure 8C:
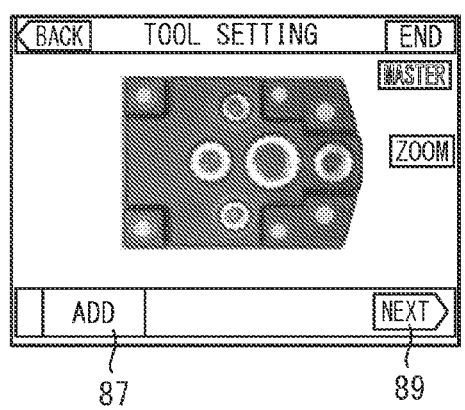
Figure 8D:
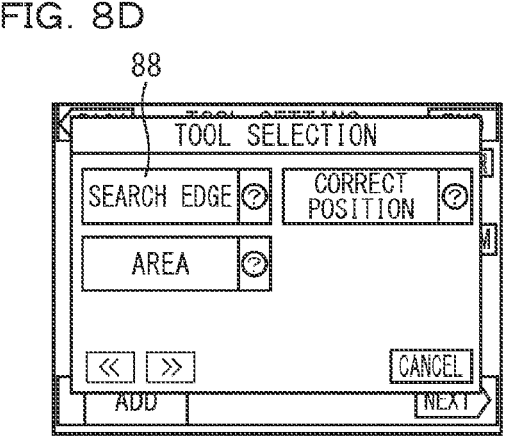
Figure 8E:
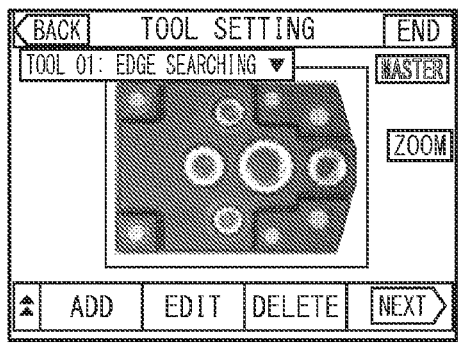
Figure 8F:
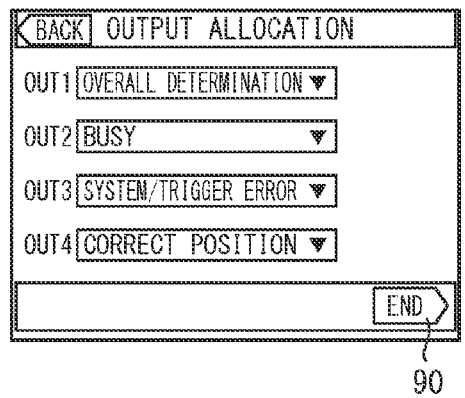

FIGS. 8A to 8F are exemplary views of setting screens in the display device 2 of the image processing sensor according to the embodiment of the present invention. Through the setting screens shown in FIGS. 8A to 8F, the user sequentially performs setting in the flow of setting of the imaging condition (FIG. 8A), registration of the master image to become a reference for pattern search (FIG. 8B), setting of a tool such as edge search on the master image (FIGS. 8C to 8E), and allocation of an output (FIG. 8F). Hereinafter, a detailed description will be given. When the "SETTING NAVIGATION" button 75 shown in FIG. 7B is selected, first, an imaging condition setting screen shown in FIG. 8A is displayed. On the imaging condition setting screen, a currently imaged image of the inspection object is displayed when the master image is not stored, and the master image is displayed in a main display region 81 when the master image is stored, and a setting button group for setting imaging conditions is displayed in the lower part of the screen. For example, when a "TRIGGER CONDITION" button is selected, it is possible to set a trigger condition for specifying a timing when the imaging device 1 images the inspection object. Although a detailed setting screen is omitted, when each button is selected, the setting screen is displayed on the touch panel 21 shown in FIG. 6 in accordance with each setting condition. The case where an "AUTOMATIC FOCUS ADJUSTMENT" button 83 is selected will be described later.

Further, for more detailed setting, an "EXTENDED FUNCTION" button 82 of FIG. 8A may be selected. When the "EXTENDED FUNCTION" button 82 is selected, a button for performing detailed setting is separately displayed. As described above, on the imaging condition setting screen, it is possible to adjust brightness, adjust focus, and set imaging range, on/off of illumination, on/off of zooming, and the like. Focus adjustment will be described later.

When a "screen transition" button 84 displayed as "NEXT" of FIG. 8A is selected, a master image registering screen shown in FIG. 8B is displayed. Hereinafter, a variety of tools for inspection will be set on the registered master image. A plurality of programs can be stored with respect to one master image. That is, different tools can be set with respect to the same master image, and can be previously stored as different programs.

As the master image, an image of the currently imaged inspection object may be registered, or an image selected from previously imaged images may be registered. In the case of registering the currently imaged image, the user may select the "REGISTER LIVE IMAGE" button 85. An image being imaged at the time of selection of the "REGISTER LIVE IMAGE" button 85 is registered as the master image.

When a "screen transition" button 86 displayed as "NEXT" of FIG. 8B is selected, a tool setting screen shown for each master image, shown in FIG. 8C, is displayed. Hereinafter, a variety of tools for inspection will be set on the master image.

On the tool setting screen, a tool for executing the inspection is additionally set in the displayed master image. When an "ADD" button 87 shown in FIG. 8C is selected, a tool selecting screen shown in FIG. 8D is displayed. A tool selected on the tool selecting screen is additionally set. For example, when a "SEARCH EDGE" button 88 is selected, an edge search setting screen shown in FIG. 8E is displayed. By previously setting which edge of the master image is to be checked with the imaged image of the inspection object on the edge search setting screen, it is possible to determine failure/non-failure of the inspection object in accordance with whether or not a defect has been detected. Hereinafter, a color area, positional correction, and the like can be set.

When a "screen transition" button 89 displayed as "NEXT" of FIG. 8C is selected, an output allocating screen, shown in FIG. 8F, is displayed. When an "END" button 90 is selected, the screen display returns to "setting mode" shown in FIG. 7B. In this manner, by sequentially selecting the "screen transition" buttons 84, 86, 89 displayed as "NEXT" on the touch panel 21 of the display device 2 shown in FIG. 6, the user can easily set in a short period of time a variety of parameters which are used for the inspection. Further, since even a user who is not used to the image processing sensor is guided to a next operation on the touch panel 21 of the display device 2, a variety of parameters can be easily set.

Figure 9:
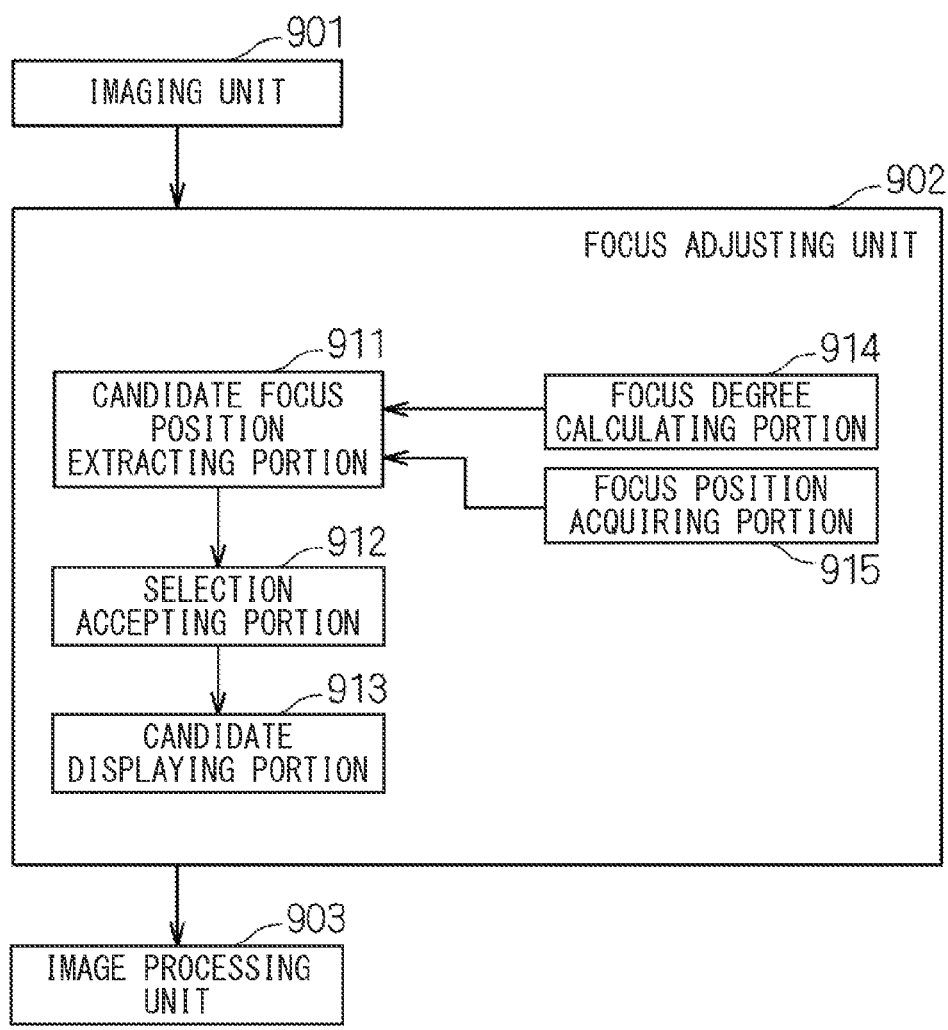
FIG. 9 is a function block diagram of the image processing sensor according to the embodiment of the present invention.

FIG. 9 is a function block diagram of the image processing sensor according to the embodiment of the present invention. In FIG. 9, an imaging unit 901 images an imaged region including an inspection object. In the camera module 14 of FIG. 4, a function of the CMOS substrate 142 corresponds to this.

A focus adjusting unit 902 adjusts a focus position with respect to the inspection object. The focus adjusting unit 902 is provided with a candidate focus position extracting portion (part) 911, a selection accepting portion (part) 912, a candidate displaying portion (part) 913, a focus degree calculating portion (part) 914, and a focus position acquiring portion (part) 915.

The candidate focus position extracting portion (part) 911 extracts as candidate focus positions a plurality of positions where part of the imaged region comes into a focused state based on a plurality of pieces of different image data captured by imaging the inspection object by the camera module 14, while changing the focus position with respect to the inspection object by the focus adjustment mechanism. In order to extract the candidate focus positions, the focus degree calculating portion (part) 914 calculates the focus degree for indicating the degree of the focused state with regard to each of a plurality of small regions previously set as imaged regions, and the focus position acquiring portion (part) 915 acquires a focus position with a maximum focus degree among the focused degrees each calculated for each of the small regions. The candidate focus position extracting portion (part) 911 extracts the plurality of candidate focus positions based on the focus position acquired by the focus position acquiring portion (part) 915 for each of the small regions.

Figure 10A:
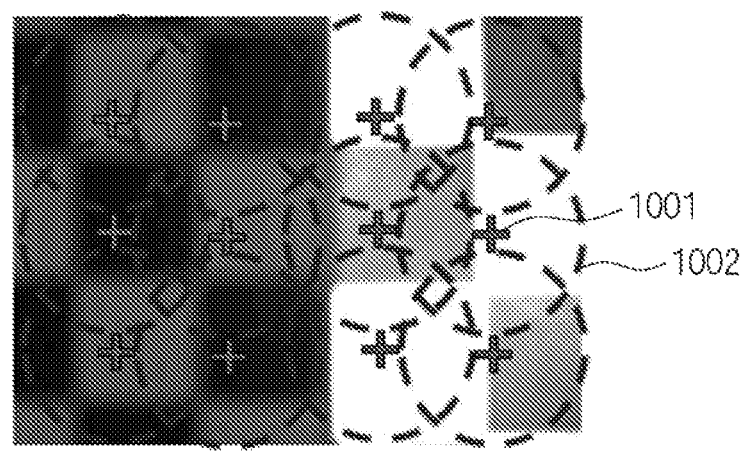
FIGS. 10A and 10B are schematic views for describing a focus degree calculating method of the image processing sensor according to the embodiment of the present invention.
Figure 10B:
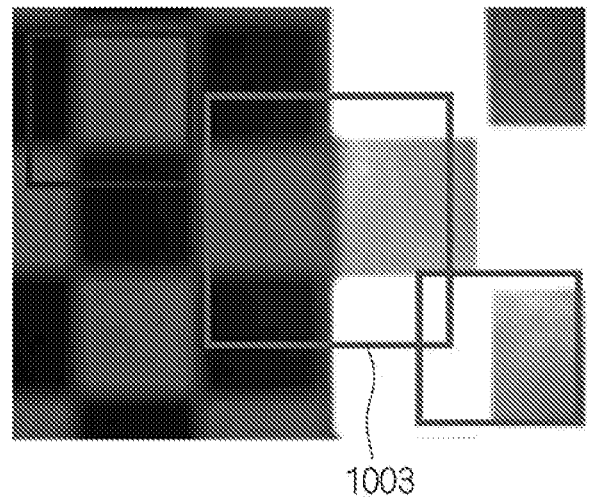

FIGS. 10A and 10B are schematic views for describing a focus degree calculating method of the image processing sensor according to the embodiment of the present invention. In FIG. 10A, a plurality of virtual centers 1001 are set at twelve points on an imaged image. An adjustment region (small region) 1002 is set on the periphery of each of the virtual centers 1001, being located several tens of pixels therefrom, and a high-frequency component is extracted in each of the adjustment regions 1002. Specifically, as a ratio (percentage) of the number of pixels of the high-frequency component to the number of pixels within the adjustment region 1002, the focus degree for each of the virtual centers 1001 (each of the adjustments regions 1002) is previously calculated and stored.

Needless to say, the method is not restricted to setting of twelve adjustment regions 1002 as the small regions, and may be a method for explicitly arranging a plurality of window regions. In FIG. 10B, a plurality of window regions 1003 are arranged on the imaged image. A high-frequency component is extracted in each of the window regions 1003, and as a ratio (percentage) of the number of pixels of the high-frequency component to the number of pixels within the window region 1003, the focus degree for each of the window regions 1003 is previously calculated and stored.

Although the focus degree calculating method shown in FIG. 10 is a method for dynamically calculating the focus degree with respect to an image imaged by the imaging unit, a high-frequency component may be finely detected if a previously imaged and stored image is used. In this case, differently from FIG. 10, setting twelve virtual centers 1001 is not necessary, and a detailed high-frequency extracted image can be created on a full screen.

Figure 11A:
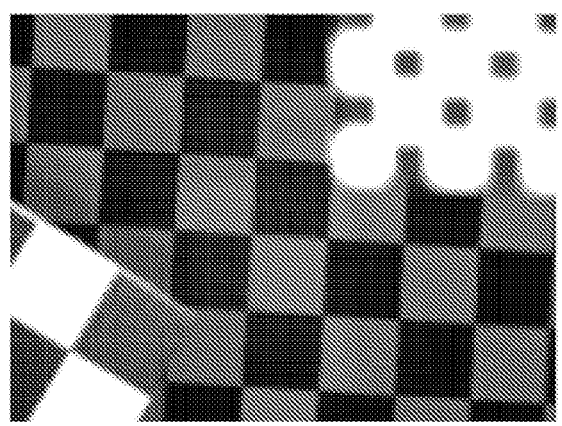
FIGS. 11A to 11C are schematic views for describing a focus degree calculating method based on stored image data, performed by the image processing sensor according to the embodiment of the present invention.
Figure 11B:
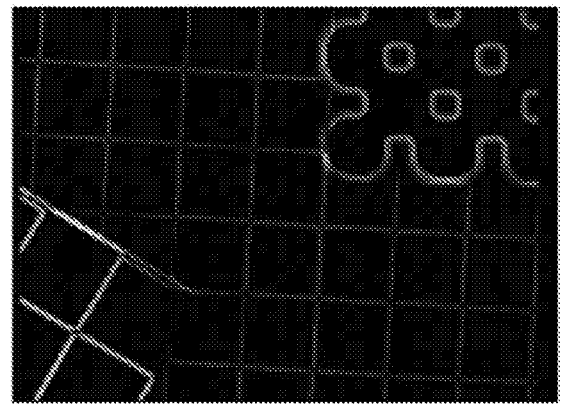
Figure 11C:
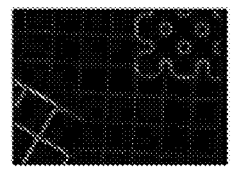

FIGS. 11A to 11C are schematic views for describing a focus degree calculating method based on a stored image, performed by the image processing sensor according to the embodiment of the present invention. A high-frequency component of an imaged image shown in FIG. 11A is extracted, to obtain a high-frequency extracted image shown in FIG. 11B. FIG. 11B shows that the high-frequency component is present in a white portion, and is not present in a black portion. Needless to say, a high-frequency extracted image may be created in the same size as that of an original image, or the size of the high-frequency extracted image may be changed by reducing the size of the image or the like. For example, FIG. 11C shows a high-frequency extracted image of a reduced size.

The focus position acquiring portion (part) 915 extracts a plurality of candidate focus positions based on a distribution of the focus degree or the high-frequency extracted image. FIG. 12 is a table for describing a candidate focus position extracting method based on a calculated focus degree, performed by the image processing sensor according to the embodiment of the present invention. It is to be noted that the calculated focus degree may be weighed by being multiplied by a suitable fixed coefficient.

FIG. 12 shows the focus degree for each lens position at each virtual center point. Among virtual center points 1 to 12, the lens position (candidate focus positions) with a maximum focus degree at the virtual center points 1 to 8 is '20', and the lens position with a maximum focus degree at the virtual center points 9 to 12 is '35'. The lens position is '0' when it is in a contact state with the inspection object, and a value of the lens position increases as the lens 12 moves away from the inspection object, that is, as the lens 12 is closer to the camera module 14.

In the example of FIG. 12, two lens positions '20' and '35' can be extracted as the candidate focus positions. The lens position '35' is closer to the camera module 14, that is, has a shorter focus distance among the plurality of candidate focus positions, and hence the lens 12 is moved to the lens position '35' at the time of automatic focus adjustment, to adjust the focus position to the candidate focus position and complete the process.

As described with reference to FIGS. 10 to 12 in the present embodiment, the ratio (percentage) of the number of pixels of the high-frequency component (or edge component) to the number of pixels within the adjustment region 1002 is calculated as the focus degree for each of the virtual centers 1001 (each of the adjustment regions 1002), but the calculating method for the focus degree is not particularly restricted thereto. For example, an l×m filter is vertically moved at every n pixels with respect to an imaged image (l, m, n are all arbitrary integers), and a variance value of pixel values of all pixels present within an l×m region is calculated every time the filter is moved, to create a high-frequency image made up of two-dimensional array of the variance value. With respect to the created high-frequency image, addition or multiplication for weighing the variance value by means of previously decided weighing is performed, to calculate the focus degree (i.e., weighing performed by means of a coefficient based on a coordinate of the foregoing virtual center 1001, to calculate twelve focus degrees at the respective virtual centers 1001). As described above, creating the high-frequency image also allows calculation of the focus degree. In short, the calculation method for the focus degree is not particularly limited as long as the focus degree shows the degree of the focused state for each of a plurality of previously set small regions.

Herein, the focus degree actually varies more often than the case shown in the example of FIG. 12 where the focus degree does not vary. FIG. 13 is a table for describing a candidate focus position extracting method in a case where the calculated focus degree varies, the method being performed by the image processing sensor according to the embodiment of the present invention.

Differently from FIG. 12, in the example of FIG. 13, the focus degree varies at the virtual center points 2, 6, 10. When such variations occur, the number of occurrence at each of the lens positions is sorted in the descending order, and the lens position is extracted as the candidate focus position in the order from the lens position with the largest number of occurrence. At the time of extraction, the focus degree to be excluded from the candidate focus position is selected from the focus degree in the vicinity of the lens position as the extracted candidate focus position.

For example in FIG. 13, since the number of occurrence of the lens position '20' is six times, which is the largest number, the lens position '20' is extracted as the candidate focus position. When a width of the focus degree attributable to the same inspection object is '5', the lens position '15' to '25' can be regarded as the same candidate focus position, and the lens positions '15' and '25' can be excluded from the candidate focus positions.

Similarly, since the number of occurrence of the lens position '35' is three times, which is the second largest number, the lens position '35' is extracted as the candidate focus position. When the width of the focus degree attributable to the same inspection object is '5', the lens position '30' to '40' can be regarded as the same candidate focus position, and the lens positions '30' and '40' can be excluded from the candidate focus positions. As described above, the lens positions '20' and '35' are extracted as the candidate focus positions, and since the lens position '35' has a shorter focus distance, automatic adjustment is performed on the lens position '35'.

The focus position acquiring portion (part) 915 can also extract candidate focus positions based on a stored high-frequency extracted image created by extracting a high-frequency component of an image obtained by imaging the inspection object. FIGS. 14A to 14G are exemplary views of a high-frequency extracted image, created by the image processing sensor according to the embodiment of the present invention.

FIG. 14A to 14G respectively show original images on the left side and high-frequency extracted images based on the focus degrees on the right side. A portion displayed in white in the high-frequency extracted image on the right side shows a portion having a large quantity of high-frequency component, that is, a portion having a focus degree larger than a predetermined value.

The focus position acquiring portion (part) 915 selects a high-frequency extracted image with a maximum focus degree for each pixel of the created high-frequency extracted image. FIG. 15 is an exemplary view showing arrangement of the focus degrees, representing for each pixel an image number of the high-frequency extracted image with a maximum focus degree.

Figure 14:
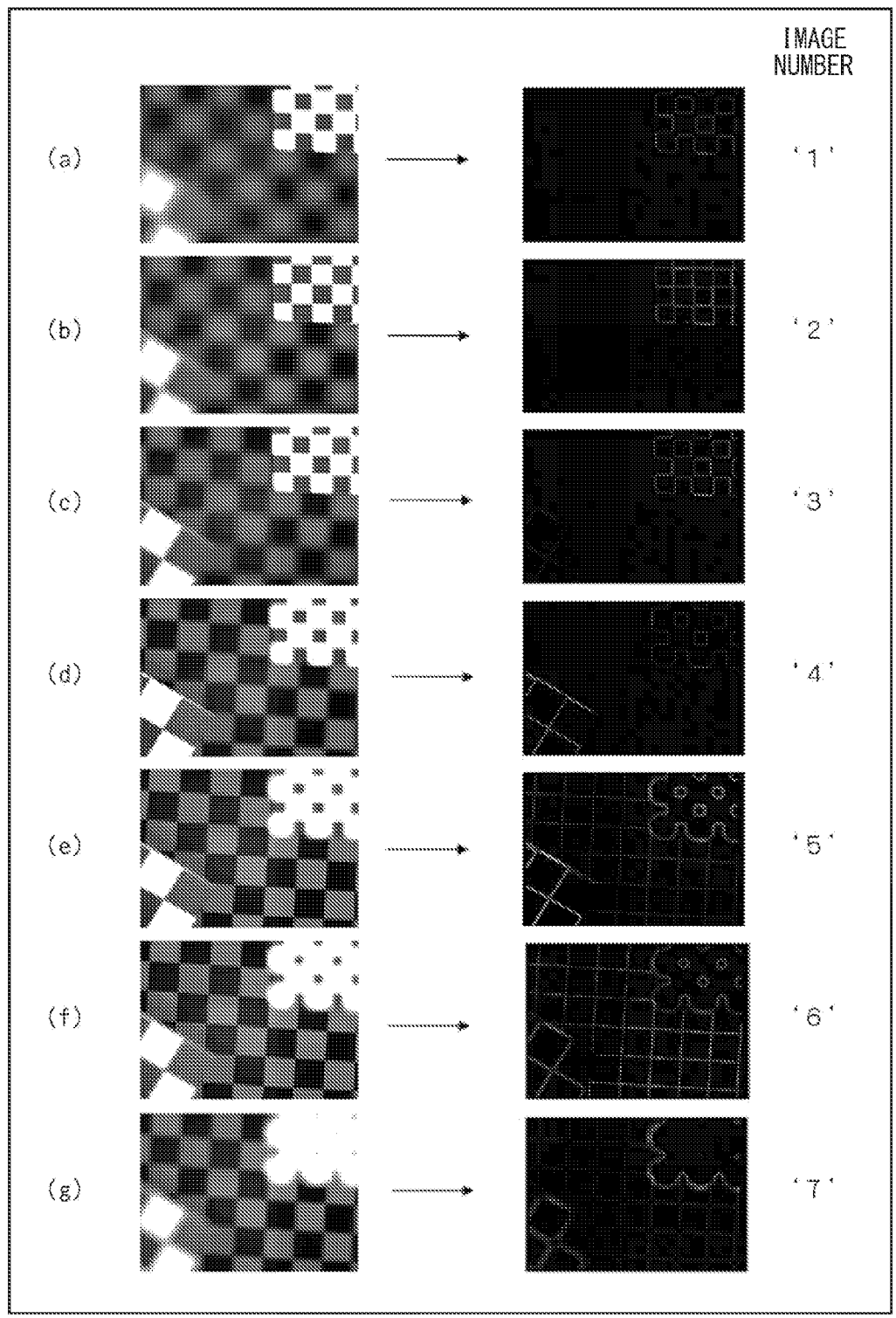
FIGS. 14A to 14G are exemplary views of a high-frequency extracted image, created by the image processing sensor according to the embodiment of the present invention.

FIG. 15 represents the image number of the high-frequency extracted image shown in FIG. 14 with the maximum focus degree for each pixel. For example, a pixel represented as '2' indicates that the focus degree of the image number '2' is maximal. A region where the same image numbers are sequentially represented can be specified as the focused region, and extracted as the candidate focus position.

It is to be noted that the value is often not stable on a boundary of focused regions, but in this case, the focused region itself, even including the adjacent focused regions, does not significantly fluctuate. Further, a pixel with a relatively small maximum value of focus degree is susceptible to noise. Therefore, a minimum value of the focus degree that can be specified as the focused region may be previously set, and when the focus degree is not larger than the minimum value, the region may not be included in the focused region.

Further, when a blurred portion or the like is present in the original image, the region might be judged to have a large quantity of high-frequency component, and wrongly recognized as being in the focused state. In order to avoid this, each pixel of the high-frequency extracted image is not compared as it is, but a value subjected to filter processing for each pixel with respect to the original image (image on the left side of FIG. 14), or a value obtained by calculating a standard deviation and performing division thereby, may be compared to select the high-frequency extracted image with a maximum value.

Moreover, the high-frequency component might be wrongly calculated in a large quantity depending on a pattern. Thereat, for each pixel, a peripheral pixel value may be weighed to decide a pixel value, or a maximum value of the peripheral pixel value may be taken as a representative value to decide a pixel value, whereby a high-frequency extracted image may be created based on the decided pixel value. In this manner, an influence of an error due to the pattern can be reduced. Therefore, a region with a maximum focus degree for each pixel can be highly accurately specified as the focused region from the high-frequency extracted image, and can be extracted as the candidate focus position.

Needless to say, by combination of the above methods, a region with a maximum focus degree for each pixel can be highly accurately specified as the focus region from the high-frequency extracted image, and can be extracted as the candidate focus position.

Returning to FIG. 9, the selection accepting portion (part) 912 accepts selection of one candidate focus position among the plurality of extracted candidate focus positions. The method for accepting the selection is not particularly limited, and any method can be used as long as the selection of information from which the candidate focus position displayed on the touch panel 21 of the display device 2 is identifiable can be accepted.

When the selection of one candidate focus position is accepted with the selection accepting portion (part) 912, the focus position is adjusted to one candidate focus position, the selection of which has been accepted. Specifically, the DSP 132 (or this may be the FPGA 131) transmits a rotation instruction to the motor 141 of the camera module 14 via the motor driver 181, to move the lens 12 and adjust the focus position to the one candidate focus position, the selection of which has been accepted.

The candidate displaying portion (part) 913 displays an image of the inspection object imaged upon adjusting the focus position to the one candidate focus position, the selection of which has been accepted. The candidate displaying portion (part) 913 preferably displays candidate focus position information concerning the plurality of extracted candidate focus positions in a superimposed manner on the displayed image. This is because it is possible to visually check whether or not a desired characteristic portion of the inspection object is clearly displayed at which candidate focus position, whereby a focus position corresponding to the desired characteristic portion can be selected.

An image processing unit 903 executes image processing on image data subjected to focus adjustment. This corresponds to pre-processing on image data captured by imaging, performed by the FPGA 131 of the main substrate 13, such as brightness adjustment processing or white noise adjustment processing.

In the present embodiment, inspection condition data in the case of performing focus adjustment is set and stored from the "setting mode" screen shown in FIG. 7B. The "SETTING NAVIGATION" button 75 is selected from the "setting mode" screen shown in FIG. 7B, and the screen shown in FIG. 8A is displayed. The "Automatic focus adjustment" button 83 of FIG. 8A is selected to perform focus adjustment.

Figure 16A:
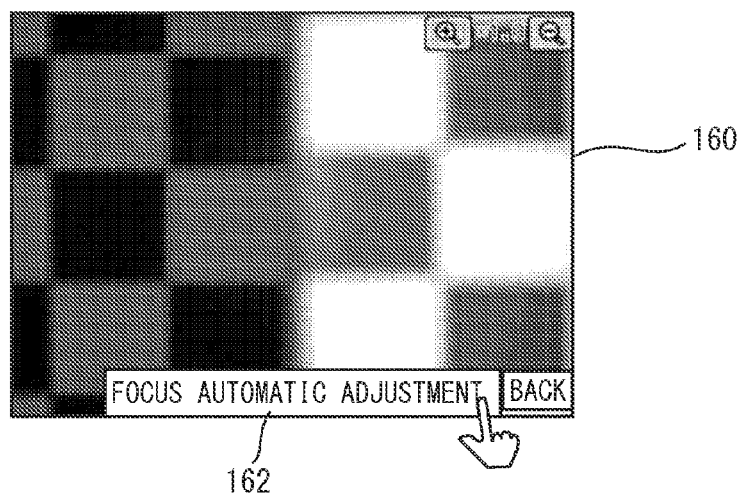
FIGS. 16A to 16C are exemplary views of an automatic focus adjustment screen in the display device of the image processing sensor according to the embodiment of the present invention.
Figure 16B:
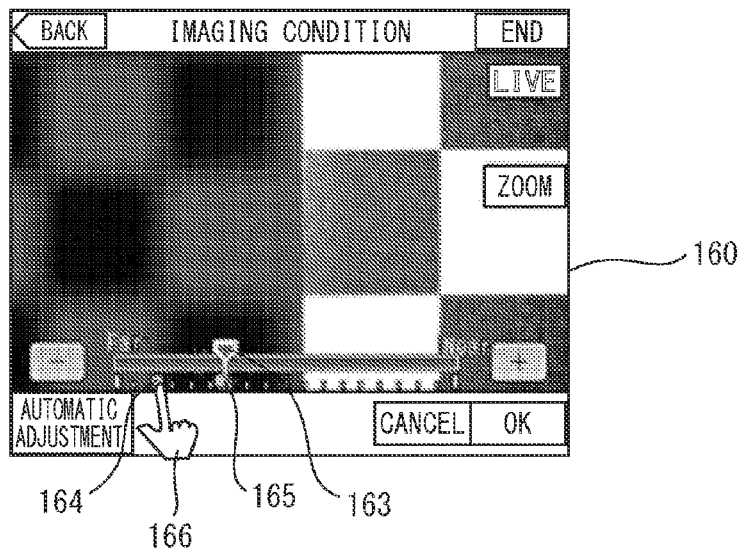
Figure 16C:
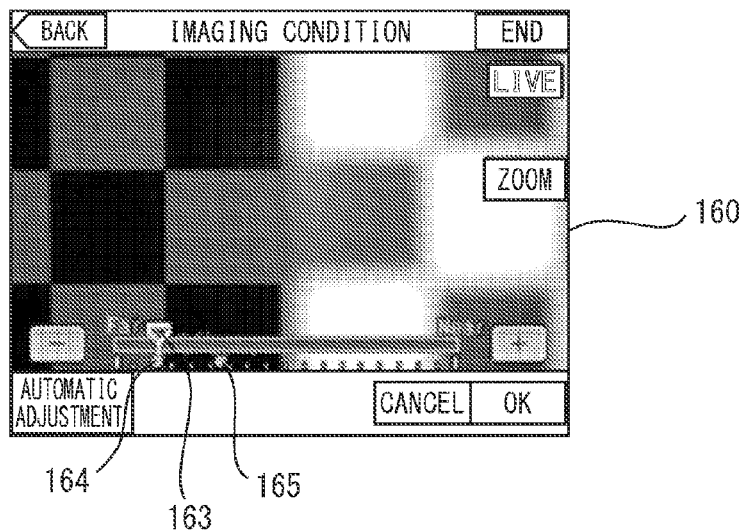

FIGS. 16A to 16C are exemplary views of an automatic focus adjustment screen in the display device 2 of the image processing sensor according to the embodiment of the present invention. In FIG. 16A, a currently imaged image of the inspection object is displayed in a main display region 160. When an "Automatic focus adjustment" button 162 is selected in this state, automatic focus adjustment is executed.

Specifically, upon selection of the "Automatic focus adjustment" button 162, the DSP 132 transmits a rotation control signal to the motor driver 181, to rotate the motor 141. The lens 12 is moved from a position having a shortest distance from (closest to) the inspection object to a position farthest from the inspection object, and the inspection object is imaged for a plurality of times during movement. A plurality of candidate focus positions are extracted based on the plurality of pieces of imaged image data, such as the focus degree.

The lens 12 is moved to a candidate focus position which is the closest to the camera module 14, namely, having the shortest focus distance, among the plurality of extracted candidate focus positions, to adjust the focus position to the candidate focus position and complete the automatic focus adjustment. FIG. 16B is an exemplary view of an adjustment completion screen at the time of completion of the automatic focus adjustment.

As for the image displayed in the main display region 160, both right and left images of the displayed image of the inspection object are blurred in FIG. 16A, whereas the image on the right side is clearly displayed in FIG. 16B. This is because the lens 12 has been moved to the candidate focus position having the short focus distance.

On the adjustment completion screen, candidate focus positions 164, 165, and a current focus position 163 are displayed. In the example of FIG. 16B, the current focus position 163 agrees with the candidate focus position 165. On the adjustment completion screen of FIG. 16B, one bar with its left end being "Far" and its right end being "Near" is displayed on the lower side of the screen, and buttons indicating the candidate focus positions 164, 165 are arranged on the displayed bar in the vicinity of the respectively corresponding candidate focus positions. This allows the user to grasp at first glance how long the focus distances of the candidate focus positions 164, 165 are.

Further, an inverted triangular figure indicating the current focus position 163 is also arranged on the displayed bar in the vicinity of the corresponding candidate focus position (arranged at a position pointing the candidate focus position 165 in FIG. 16B and at a position pointing the candidate focus position 164 in FIG. 16C). This allows the user to grasp at first glance how long the focus distance of the currently displayed image is.

In addition, for showing the current focus position 163, instead of the inverted triangular figure as shown in FIG. 16C, for example, a button indicating the current focus position 163 between a button indicating the candidate focus position 164 and a button indicating the candidate focus position 165 may be illuminated. That is, in order to allow the user to select a position among the plurality of extracted candidate focus positions on the touch panel 21 of the display device 2, candidate focus position information concerning the plurality of extracted candidate focus positions (preferably, the plurality of candidate focus positions and the current focus position) is displayed.

The user can perform an operation to change the current focus position 163 to another candidate focus position 164, so as to move the lens 12 to another candidate focus position. For example, by touching another candidate focus position 164 on display with a finger 166, the current focus position 163 is changed to another candidate focus position 164, and the image displayed in the main display region 160 is also changed.

FIG. 16C is an exemplary view of the adjustment completion screen in the case of changing the position to another candidate focus position 164. In FIG. 16C, only the image on the left side is clearly displayed. This is because the lens 12 has been moved to another candidate focus position 164 having a different focus distance.

Therefore, a plurality of candidate focus positions can be extracted by performing the automatic focus adjustment once, and the user can select a desired candidate focus position while viewing a displayed image. Further, the user is not required to specify an adjustment range, a virtual center point and the like, and can easily adjust the focus position to the desired candidate focus position.

Figure 17:
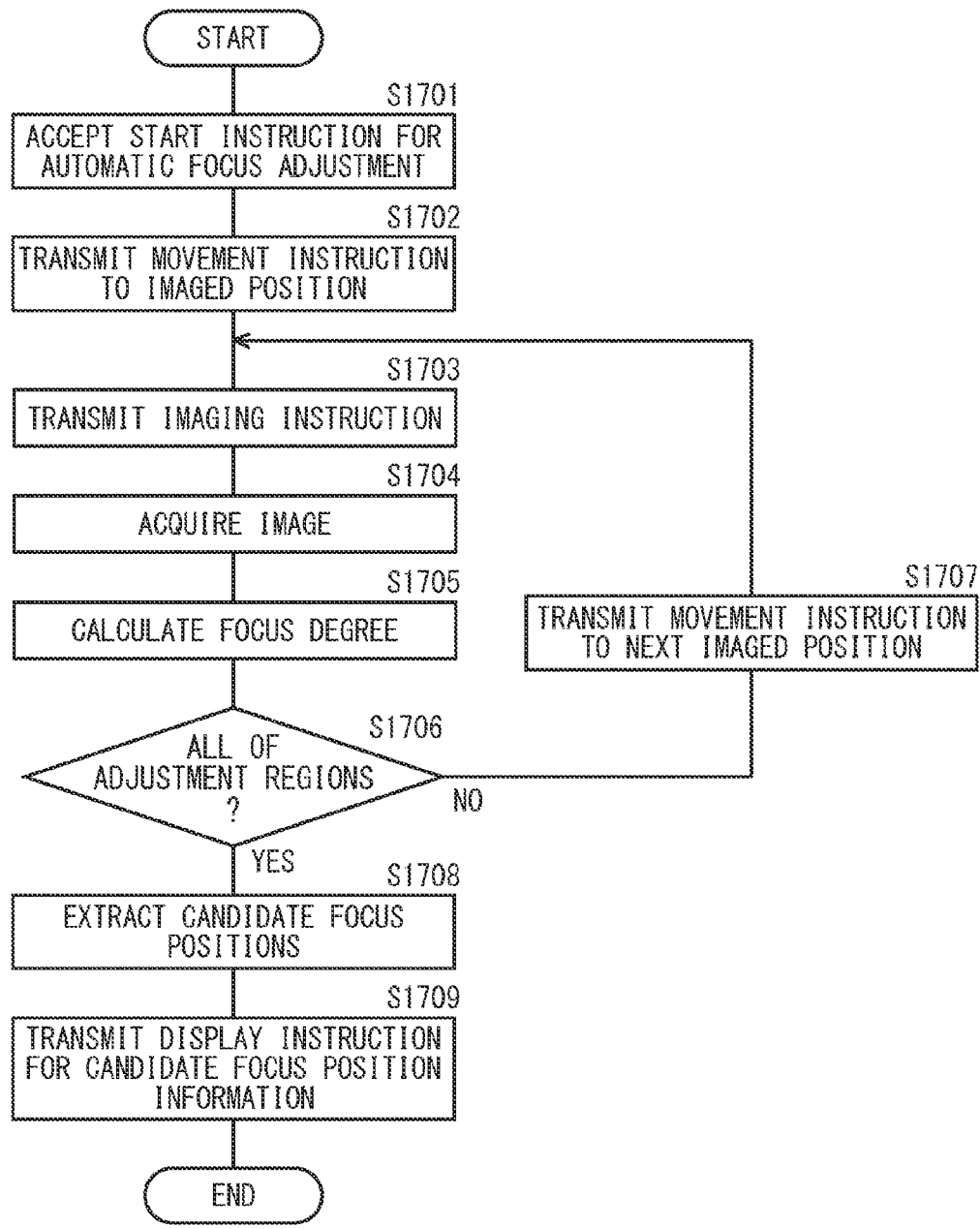
FIG. 17 is a flowchart showing a procedure for automatic focus adjustment processing of an FPGA and a DSP of a main substrate in the imaging device of the image processing sensor according to the embodiment of the present invention.

FIG. 17 is a flowchart showing a procedure for automatic focus adjustment processing of the FPGA 131 and the DSP 132 of the main substrate 13 in the imaging device 1 of the image processing sensor according to the embodiment of the present invention. The FPGA 131 accepts a start instruction for automatic focus adjustment (step S1701), and transmits to the motor driver 181a movement instruction to move the lens 12 to an imaged position corresponding to an adjustment region which is the closest to the camera module 14, namely, having the shortest focus distance (step S1702). The motor driver 181 rotates the motor 141 in accordance with the movement instruction, and moves the lens 12 to a position which is the closest to the camera module 14, namely, to a position farthest from the inspection object.

The FPGA 131 transmits an imaging instruction for the inspection object to the CMOS substrate 142 of the camera module 14 of the imaging device 1 (step S1703), and acquires an image of the inspection object which was imaged by the CMOS substrate 142 having received the imaging instruction (step S1704).

The DSP 132 calculates the focus degree of image data of the captured image (step S1705). Herein, the focus degree is calculated using the focus degree calculating method described in FIGS. 10 and 11.

The DSP 132 determines whether or not the focus degrees with regard to all of adjustment regions of the captured image data have been calculated (step S1706).

When the DSP 132 determines that an adjustment region whose focus degree has not been calculated is present (step S1706: NO), the DSP 132 transmits to the motor driver 181a movement instruction to an imaged position corresponding to the next adjustment region (step S1707). The motor driver 181 rotates the motor 141 in accordance with the movement instruction, and moves the lens 12 to a next imaged position. The DSP 132 returns the process to step S703, and repeats the above process.

When the DSP 132 determines that the focus degrees with regard to all of adjustment regions have been calculated (step S1706: YES), the DSP 132 extracts candidate focus positions (step S1708). Herein, the candidate focus position extracting method described in FIGS. 12 and 13 is used. The DSP 132 transmits a display instruction for candidate focus position information concerning the plurality of extracted candidate focus positions to the touch panel 21 of the display device 2 (step S1709).

Figure 18A:
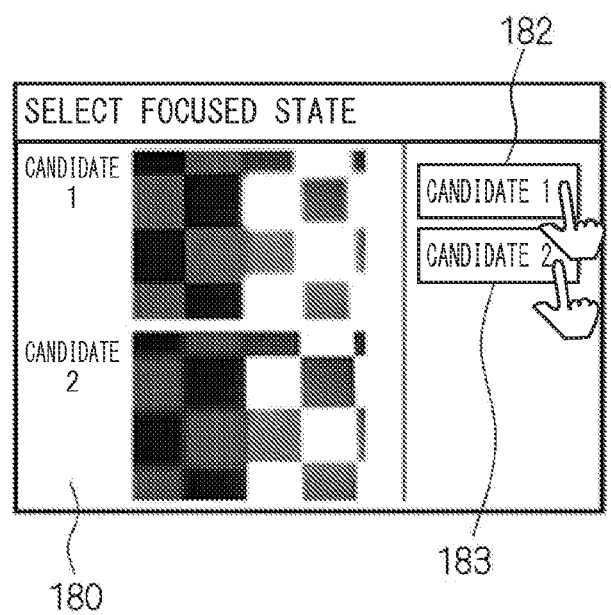
FIGS. 18A to 18C are exemplary views of a candidate-focus position selection accepting screen of the display device in the case of displaying candidate focus position information by selection of a candidate button on a touch panel.
Figure 18B:
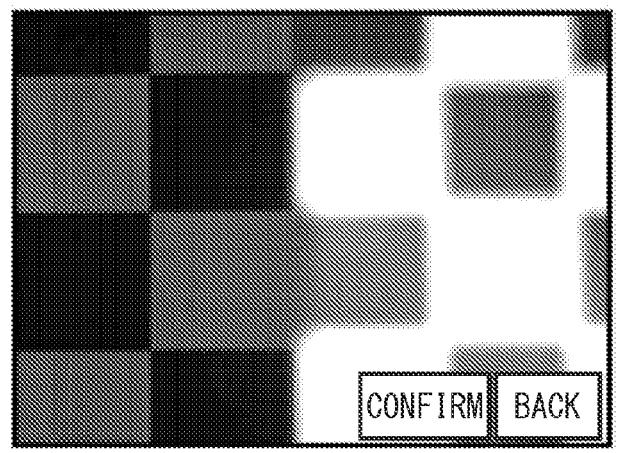
Figure 18C:
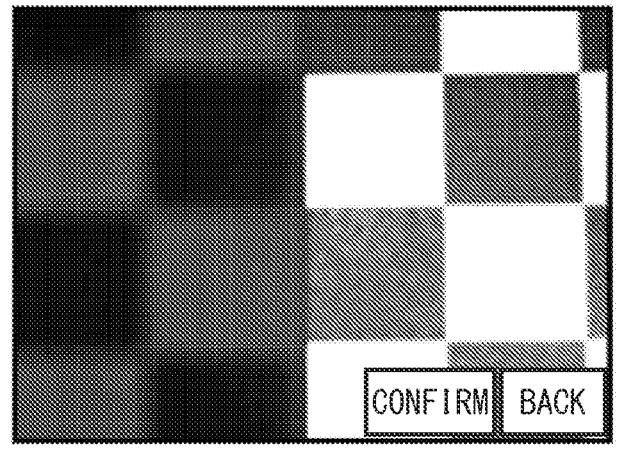

As the candidate focus position information, for example, it is not limited to display of the candidate focus positions 164, 165 shown in FIG. 16. FIGS. 18A to 18C are exemplary views of a candidate-focus position selection accepting screen of the display device 2 in the case of displaying candidate focus position information by selection of a candidate button on the touch panel 21.

As shown in FIG. 18A, a thumbnail image or the like of image data corresponding to the candidate focus position is previously displayed in an image display unit 180, and by accepting selection of "CANDIDATE" button 182 or 183, an image, the selection of which has been accepted, is displayed. For example, when the selection of the "CANDIDATE" button 182 is accepted, an image shown in FIG. 18B is displayed. It can be seen that a pattern on the left side of the image is in focus.

On the other hand, when the selection of the "CANDIDATE" button 183 is accepted, an image shown in FIG. 18C is displayed. It can be seen that a pattern on the right side of the image is in focus. Information of a plurality of candidate focus positions is simultaneously displayed in this manner, and an instruction of the candidate focus position information is accepted, thereby allowing the selection of the candidate focus position to be accepted.

Figure 19A:
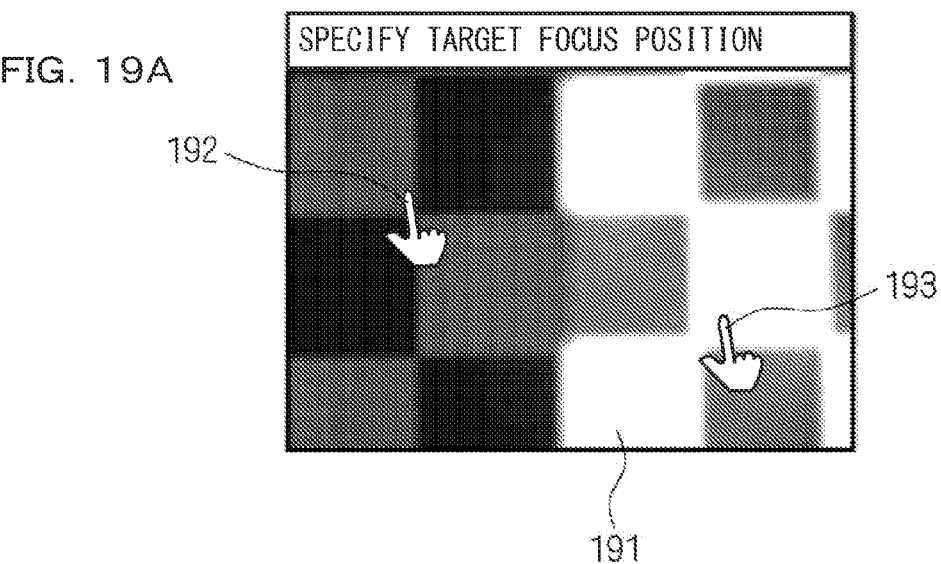
FIGS. 19A to 19C are exemplary views of the candidate-focus position selection accepting screen of the display device in the case of accepting the selection of the candidate focus position by specification of a target focus position on the touch panel.
Figure 19B:
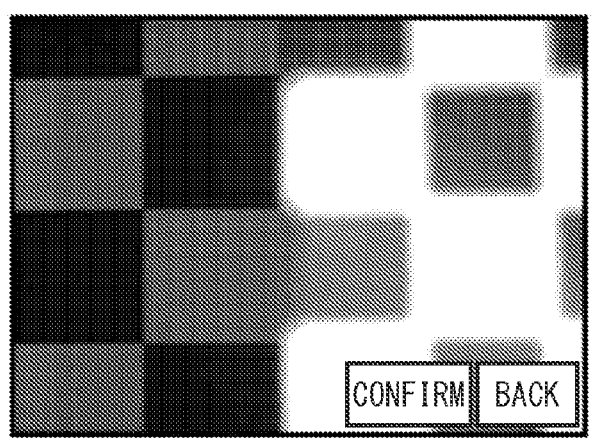
Figure 19C:
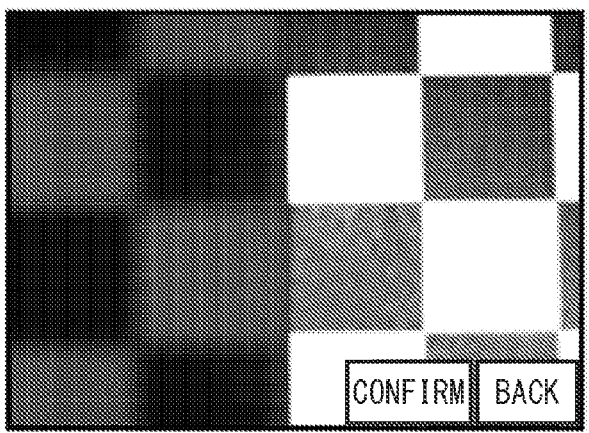

Further, even when the candidate focus position information is not displayed, the selection of the candidate focus position can be accepted directly on the touch panel 21. FIGS. 19A to 19C are exemplary views of the candidate-focus position selection accepting screen of the display device 2 in the case of accepting the selection of the candidate focus position by specification of a target focus position on the touch panel 21.

As shown in FIG. 19A, an image of the inspection object is previously displayed in an image display unit 191, and by accepting selection of a position pointed by a finger 192 or 193, the lens 12 is moved to the candidate focus position which is stored in association with a pixel of the position, the selection of which has been accepted, to display an imaged image. For example, when the selection of the position pointed by the finger 192 is accepted, an image shown in FIG. 19B is displayed. It is found that a pattern on the left side of the image is in focus.

On the other hand, when the selection of the position pointed by the finger 193 is accepted, an image shown in FIG. 19C is displayed. It is found that a pattern on the right side of the image is in focus. In this manner, it is possible to accept selection of the candidate focus position without directly displaying information of a plurality of candidate focus positions on the screen.

Figure 20A:
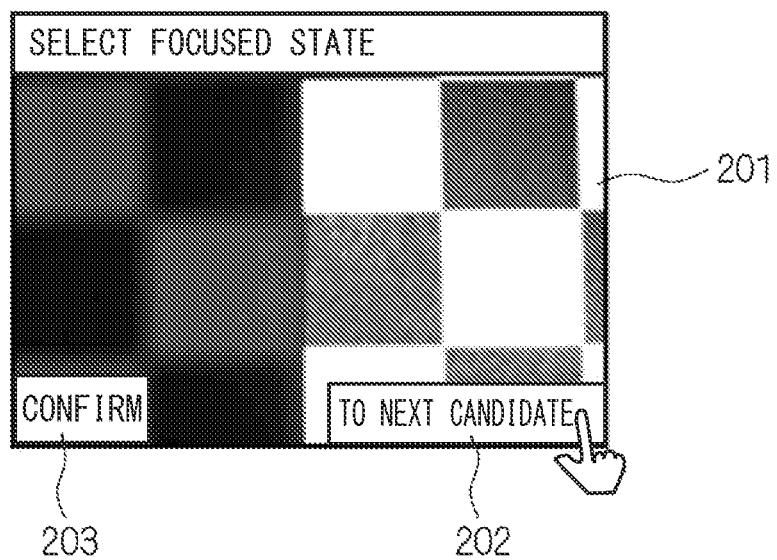
FIGS. 20A and 20B are exemplary views of a focused-state selection accepting screen of the display device where the focused state is made sequentially selectable.
Figure 20B:
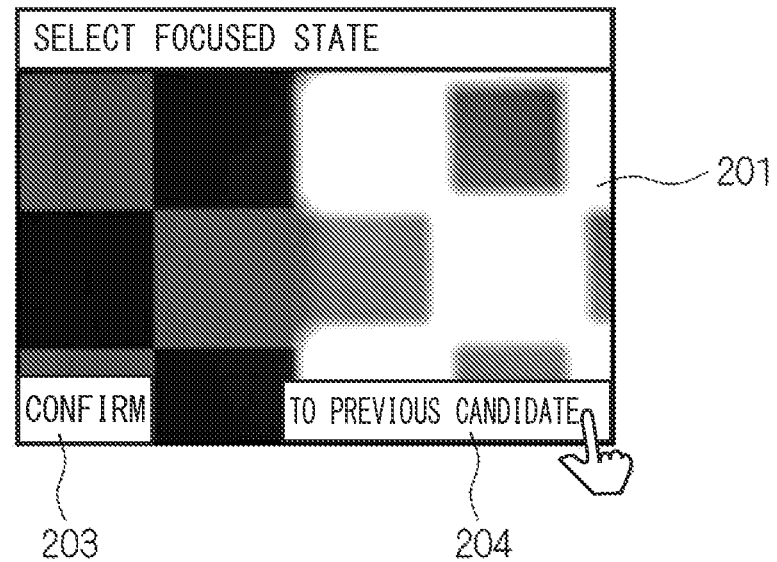

Further, candidate focus position information may be made sequentially selectable. FIGS. 20A and 20B are exemplary views of a focused-state selection accepting screen of the display device 2 where the focused state is made sequentially selectable.

As shown in FIG. 20A, an image of the inspection object is previously displayed in an image display unit 201, and by accepting selection of a "NEXT CANDIDATE" button 202 or a "PREVIOUS CANDIDATE" button 204, the lens 12 is sequentially moved to the stored candidate focus position, to display an imaged image. For example, when the selection of the "NEXT CANDIDATE" button 202 is accepted, an image shown in FIG. 20B is displayed. The displayed image may be checked, and in the case of setting the image as the focus position, selection of a "CONFIRM" button 203 may be accepted.

Further, the displayed image may be stored by setting a small region for each of the same candidate focus positions, to accept selection in units of the small region. FIGS. 21A to 21D are exemplary views of the candidate-focus position selection accepting screen of the display device 2 in the case of setting a small region for each candidate focus position.

Figure 21A:
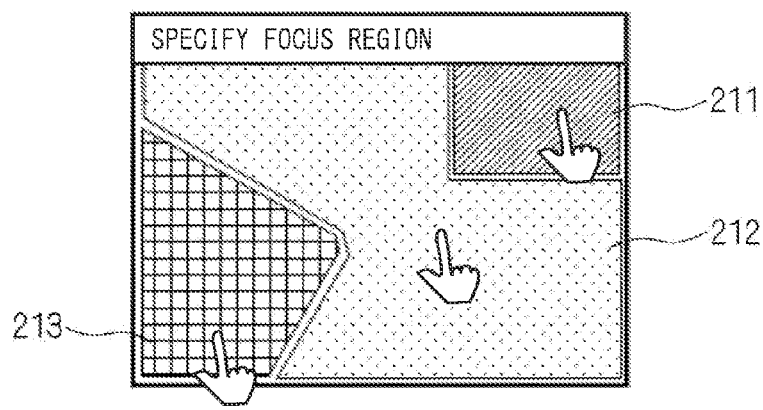
FIGS. 21A to 21D are exemplary views of the candidate-focus position selection accepting screen of the display device in the case of setting a small region for each candidate focus position.

As shown in FIG. 21A, an image of the inspection object is previously displayed in an image display unit 201, and small regions 211, 212, 213 are sectioned for respective candidate focus positions. Each of the small regions may be displayed in a color-coded manner on a screen display.

Figure 21B:
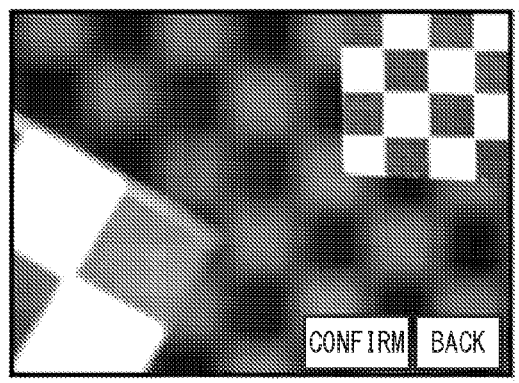
Figure 21C:
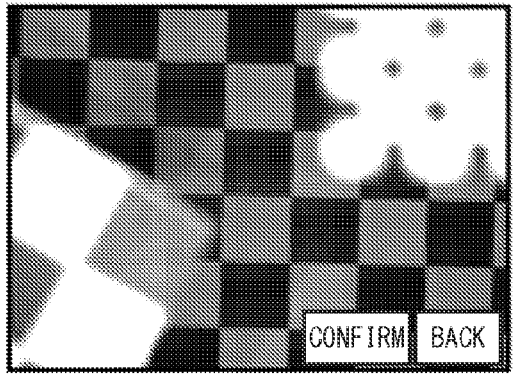
Figure 21D:
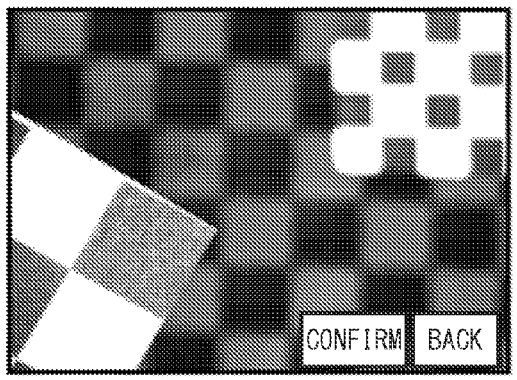

In this state, selection of each of the small regions 211, 212, 213 is accepted. For example, when selection of the small region 211 is accepted, as shown in FIG. 21B, a screen is displayed including an image in which the small region 211, the selection of which has been accepted, is in the focused state. Similarly, when selection of the small region 212 is accepted, as shown in FIG. 21C, a screen is displayed including an image in which the small region 212, the selection of which has been accepted, is in the focused state. When selection of the small region 213 is accepted, as shown in FIG. 21D, a screen is displayed including an image in which the small region 213, the selection of which has been accepted, is in the focused state.

Figure 22:
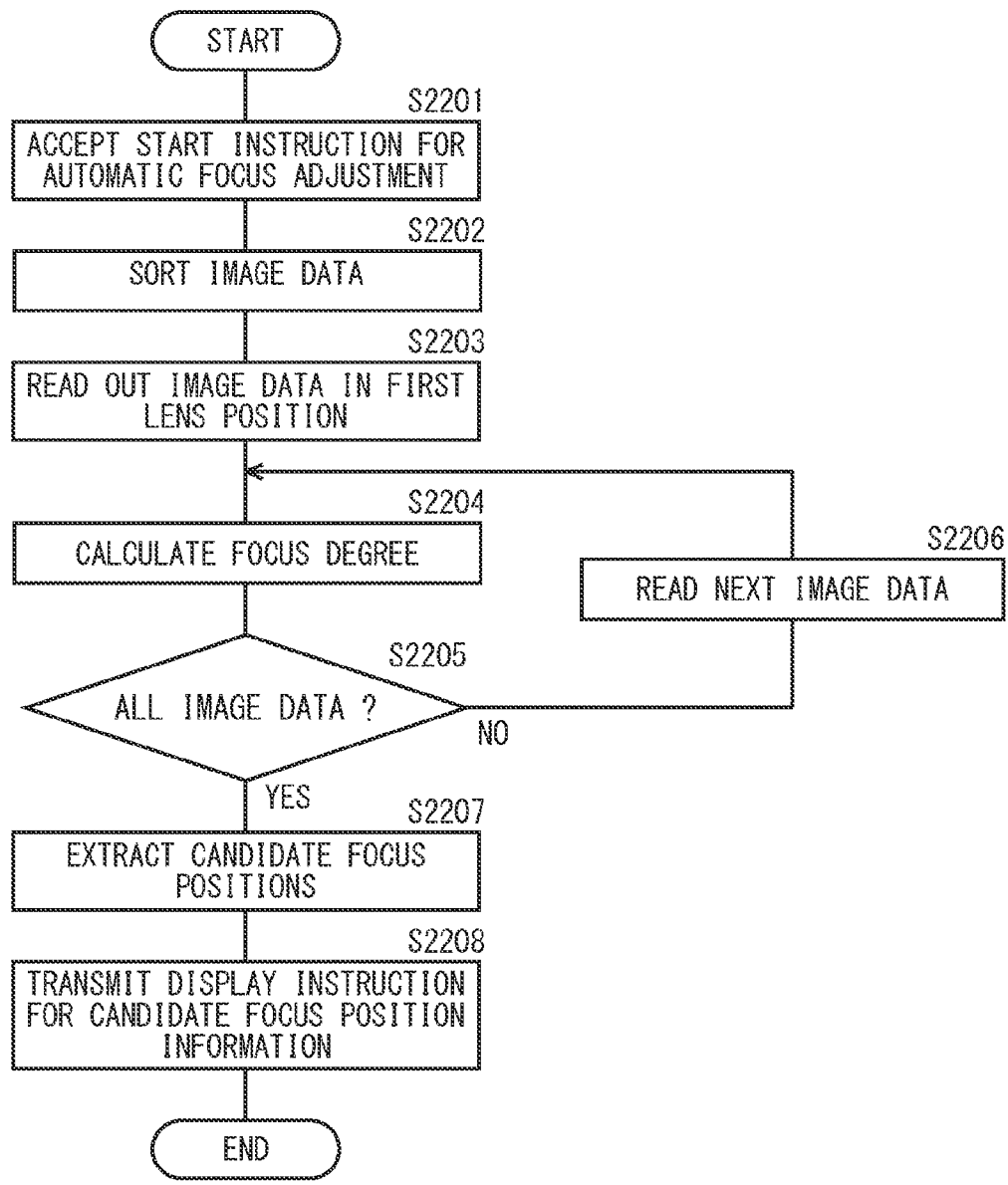
FIG. 22 is a flowchart showing a procedure for automatic focus adjustment processing based on a high-frequency extracted image, performed by a DSP of a main substrate in the imaging device of the image processing sensor according to the embodiment of the present invention.

Needless to say, the candidate focus position may be extracted based on a high-frequency extracted image created by extracting a high-frequency component of an image obtained by imaging the inspection object. FIG. 22 is a flowchart showing a procedure for automatic focus adjustment processing based on a high-frequency extracted image, performed by the DSP 132 of the main substrate 13 in the imaging device 1 of the image processing sensor according to the embodiment of the present invention. The DSP 132 accepts a start instruction for automatic focus adjustment (step S2201), and sorts stored image data of the inspection object in the order of lens positions (step S2202). The DSP 132 reads out image data of the inspection object at a first lens position (step S2203).

The DSP 132 calculates the focus degree of the read-out image data (step S2204).

The DSP 132 determines whether or not the focus degrees with regard to all of stored image data have been calculated (step S2205).

When the DSP 132 determines that image data whose focus degree has not been calculated is present (step S2205: NO), the DSP 132 reads out next image data (step S2206) and returns the process to step S2204, to repeat the above process.

When the DSP 132 determines that the focus degrees with regard to all of the image data have been calculated (step S2205: YES), the DSP 132 extracts the candidate focus position (step S2207). Herein, the candidate focus position extracting method described in FIGS. 14 and 15 is used. The DSP 132 transmits a display instruction to display candidate focus position information concerning the plurality of extracted candidate focus positions to the touch panel 21 of the display device 2 (step S2208).

As described above, according to the present embodiment, a plurality of candidate focus positions are extracted and focus adjustment can be performed while checking on a screen as to which part of the imaged region is in the focused state. Accordingly, it is possible for the user to easily select a focus position corresponding to an image in which a desired characteristic portion of the inspection object is clear.

That is, in the imaging device 1 according to the present embodiment, the inspection object is imaged by the camera module 14 while a focus position with respect to the inspection object is changed by the focus adjustment mechanism made up of the motor driver 181 and the motor 141, to acquire a plurality of pieces of different image data. Based on the captured plurality of pieces of image data, a plurality of positions where part of the imaged region comes into the focused state are extracted as candidate focus positions, and candidate focus position information concerning the plurality of extracted candidate focus positions is displayed in the display device 2. This allows the user to easily select a focus position corresponding to an image in which a desired characteristic portion of the inspection object is clear.

It is to be noted that the timing for imaging the inspection object and acquiring a plurality of pieces of different image data and the timing for extracting a plurality of candidate focus positions are not particularly limited. For example, all of the plurality of pieces of different image data may be captured first, and a plurality of candidate focus positions may be thereafter extracted using all of the captured image data. Alternatively, it may be previously decided, for example, to extract three candidate focus positions, and acquirement of image data and extraction of candidate focus positions may be alternately performed, and then completed at the time of extraction of three candidate focus positions.

Describing the latter case more specifically, image data is captured, and when one candidate focus position is extracted, the extracted candidate focus position is stored, and when a candidate focus position is to be extracted next based on the captured image data, it is determined whether or not it is a position different from the already stored candidate focus position. When the position is determined to be a different position, it is extracted as a new candidate focus position.

On the other hand, when the position is determined to be the same position, it is not extracted as a new candidate focus position (it is regarded as the same candidate focus position as the already extracted and stored candidate focus position). Such processing may be repeated and the acquirement of image data may be completed after extracting three candidate focus positions.

The present invention is not limited to the above embodiment, and a variety of changes, modifications, and the like can be made as long as it is within the scope of the gist of the present invention. For example, the imaging device 1 and the display device 2 are not limited to the form of being directly connected through the connection cable 3, and needless to say, the imaging device 1 and the display device 2 may be connected via a network such as LAN, WAN, or the like. Further, although the imaging device 1 and the display device 2 are separated bodies in the present embodiment, the imaging device 1 and the display device 2 may be combined to form an image processing apparatus.

What is claimed is:

1. An image processing apparatus, comprising:
    an imaging unit for imaging a region including an inspection object;
    a display unit for displaying an image imaged by the imaging unit;
    a focus adjusting unit having a focus adjustment mechanism for adjusting a focus position with respect to the inspection object; and
    an image processing unit for executing image processing on image data captured by imaging with the imaging unit, wherein
    the focus adjusting unit includes
        a candidate focus position extracting portion for extracting as candidate focus positions a plurality of positions where part of the imaged region comes into a focused state based on a plurality of pieces of different image data captured by imaging the inspection object by the imaging unit, while changing the focus position with respect to the inspection object by the focus adjustment mechanism, and
        a candidate displaying portion for displaying candidate focus position information concerning the plurality of extracted candidate focus positions in the display unit.

2. The image processing apparatus according to claim 1, wherein
    the candidate displaying portion displays in the display unit the candidate focus position information concerning the plurality of extracted candidate focus positions so as to be selectable by a user,
    the focus adjusting unit is provided with a selection accepting portion for accepting selection of one candidate focus position among the plurality of candidate focus positions displayed in the display unit, and
    when the selection of one candidate focus position is accepted by the selection accepting portion, the focus adjusting unit displays in the display unit an image in which the focus position is adjusted to the at least one candidate focus position, the selection of which has been accepted.

3. The image processing apparatus according to claim 1, wherein
    the focus adjusting unit is provided with a selection accepting portion for accepting selection of one candidate focus position among the plurality of extracted candidate focus positions, and
    when the selection of one candidate focus position is accepted by the selection accepting portion, the focus adjusting unit adjusts the focus position to the one candidate focus position, the selection of which has been accepted.

4. The image processing apparatus according to claim 1, wherein
    the focus adjusting unit is provided with a selection accepting portion for accepting selection of one candidate focus position, and
    when the selection of one candidate focus position is accepted by the selection accepting portion, the candidate displaying portion displays in the display unit an image imaged upon adjusting the focus position to the one candidate focus position, the selection of which has been accepted.

5. The image processing apparatus according to claim 1, wherein the candidate displaying portion displays in the display unit a candidate focus position having a shortest distance from the imaging unit among the plurality of candidate focus positions.

6. The image processing apparatus according to claim 1, wherein
    the focus adjusting unit is provided with a focus degree calculation portion for calculating a focus degree for indicating a degree of a focused state with regard to each of a plurality of previously set small regions, and a focus position acquiring portion for acquiring a focus position with a maximum focus degree among the focused degrees each calculated for each of the small regions, and
    the candidate focus position extracting portion extracts the candidate focus positions based on the acquired focus position for each of the small regions.

7. A focus adjusting method executable by an image processing apparatus, the apparatus including:
    an imaging unit for imaging a region including an inspection object;
    a display unit for displaying an image imaged by the imaging unit;
    a focus adjusting unit having a focus adjustment mechanism for adjusting a focus position with respect to the inspection object; and
    an image processing unit for executing image processing on image data captured by imaging with the imaging unit, wherein
    the focus adjusting unit
        extracts as candidate focus positions a plurality of positions where part of the imaged region comes into a focused state based on a plurality of pieces of different image data captured by imaging the inspection object by the imaging unit, while changing the focus position with respect to the inspection object by the focus adjustment mechanism, and
        displays candidate focus position information concerning the plurality of extracted candidate focus positions in the display unit.

8. The focus adjusting method according to claim 7, wherein
the candidate focus position information concerning the plurality of extracted candidate focus positions are displayed in the display unit so as to be selectable by a user in the display unit,
the focus adjusting unit accepts selection of one candidate focus position among the plurality of candidate focus positions displayed in the display unit, and
when the selection of one candidate focus position is accepted, the focus adjusting unit displays in the display unit an image in which the focus position is adjusted to at least one candidate focus position, the selection of which has been accepted.

9. The focus adjusting method according to claim 7, wherein
the focus adjusting unit accepts selection of one candidate focus position among the plurality of extracted candidate focus positions, and
when the selection of one candidate focus position is accepted, the focus adjusting unit adjusts the focus position to the one candidate focus position, the selection of which has been accepted.

10. The focus adjusting method according to claim 7, wherein
the focus adjusting unit accepts selection of one candidate focus position, and
when the selection of one candidate focus position is accepted, the focus adjusting unit displays in the display unit an image imaged upon adjusting the focus position to the one candidate focus position, the selection of which has been accepted.

11. The focus adjusting method according to claim 7, wherein the candidate displaying portion displays in the display unit a candidate focus position having a shortest distance from the imaging unit among the plurality of candidate focus positions.

12. The focus adjusting method according to claim 7, wherein
the focus adjusting unit
calculates the focus degree for indicating the degree of a focused state with regard to each of a plurality of previously set small regions,
acquires a focus position with a maximum focus degree among the focused degrees each calculated for each of the small regions, and
extracts the candidate focus positions based on the acquired focus position for each of the small regions.

* * * * *